US006870085B2

(12) United States Patent
MacCutcheon

(10) Patent No.: US 6,870,085 B2
(45) Date of Patent: Mar. 22, 2005

(54) MUSIC TEACHING SYSTEM AND METHOD

(76) Inventor: Jane S. MacCutcheon, P.O. Box 6129, Raleigh, NC (US) 27628

( * ) Notice: Subject to any disclaimer, the term of this patent is extended or adjusted under 35 U.S.C. 154(b) by 0 days.

(21) Appl. No.: 09/921,540

(22) Filed: Aug. 3, 2001

(65) Prior Publication Data
US 2002/0050206 A1 May 2, 2002

Related U.S. Application Data
(60) Provisional application No. 60/222,740, filed on Aug. 3, 2000.

(51) Int. Cl.[7] .............................................. G09B 15/02
(52) U.S. Cl. .................................................... 84/477 R
(58) Field of Search ........................... 84/477 R, 470 R, 84/476, 478, 479 R, 481, 47 A, 483.1, 483.2, 484, 471 R, 473, 177 R

(56) References Cited
U.S. PATENT DOCUMENTS

| | | |
|---|---|---|
| 1,201,769 A | 10/1916 | Siegel |
| 1,526,547 A | 2/1925 | Hughey |
| 1,806,964 A | 5/1931 | Bundy |
| 2,221,143 A | 11/1940 | Lang ............................ 84/478 |
| 2,284,868 A | 6/1942 | Heaney ........................ 84/478 |
| 2,315,793 A | 4/1943 | Jay .............................. 84/476 |
| 2,347,950 A | 5/1944 | Huish .......................... 84/478 |
| 2,447,213 A | 8/1948 | Sledge |
| 2,807,183 A | 9/1957 | Ney ............................. 84/471 |
| 3,403,590 A | 10/1968 | Quinton ....................... 84/470 |
| 3,960,046 A | * 6/1976 | Choong ..................... 84/471 R |
| 4,807,509 A | * 2/1989 | Graham .................... 84/314 R |
| 4,885,969 A | 12/1989 | Chesters ..................... 84/1.01 |
| 5,496,179 A | * 3/1996 | Hoffman ..................... 434/433 |
| 5,540,132 A | 7/1996 | Hale |
| 5,546,843 A | 8/1996 | Degaard |
| 5,574,238 A | 11/1996 | Mencher ..................... 84/483.2 |
| 5,775,915 A | 7/1998 | Quinn ......................... 434/156 |
| 5,977,462 A | 11/1999 | Wolfson ...................... 84/267 |
| 5,998,721 A | 12/1999 | Lepinski ..................... 84/483.2 |
| 6,046,397 A | 4/2000 | Rose |
| 6,051,773 A | 4/2000 | Rose |
| 6,057,501 A | * 5/2000 | Hale ......................... 84/470 R |
| 6,137,039 A | 10/2000 | Rose |
| 6,194,645 B1 | 2/2001 | Rose |
| 6,198,030 B1 | 3/2001 | Rose |
| 6,284,961 B1 | 9/2001 | Kimmel, Jr. ................. 84/478 |
| 6,288,315 B1 | * 9/2001 | Bennett .................... 84/470 R |
| 6,452,080 B1 | * 9/2002 | Coonce .................... 84/477 R |
| 6,469,238 B1 | * 10/2002 | Risley ...................... 84/470 R |

OTHER PUBLICATIONS

Source unknown, admitted prior art, Author: Johann Bach.

* cited by examiner

Primary Examiner—Kimberly Lockett
(74) Attorney, Agent, or Firm—Withrow & Terranova, PLLC

(57) ABSTRACT

A method facilitating the learning of music by matching coded note symbols of musical compositions to coded note location and formation identifiers of instruments. Colors, in the preferred embodiment each having a name beginning with one of the letters names of the musical alphabet, are combined with octave group pitch marks, enabling the coding of musical notes. In the preferred embodiment of the invention, the colors are paired with stylized animal images. These animal images' names are coupled with the color names of the invention via reiteration of the first letter of the names to enhance the remembering of the relationship between color and note. The invention's color coding system is also applied to musical composition structures for easy identification of musical elements such as compositional keys and key signature.

58 Claims, 14 Drawing Sheets

FIG. 2
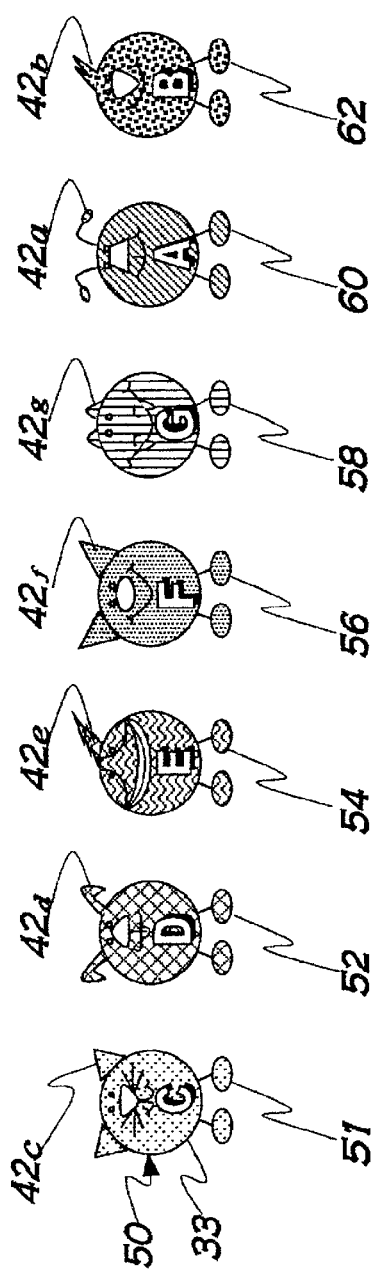
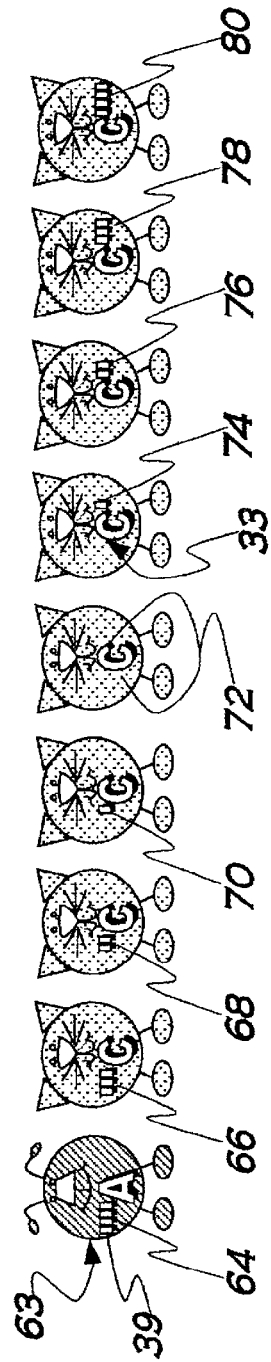

FIG. 8
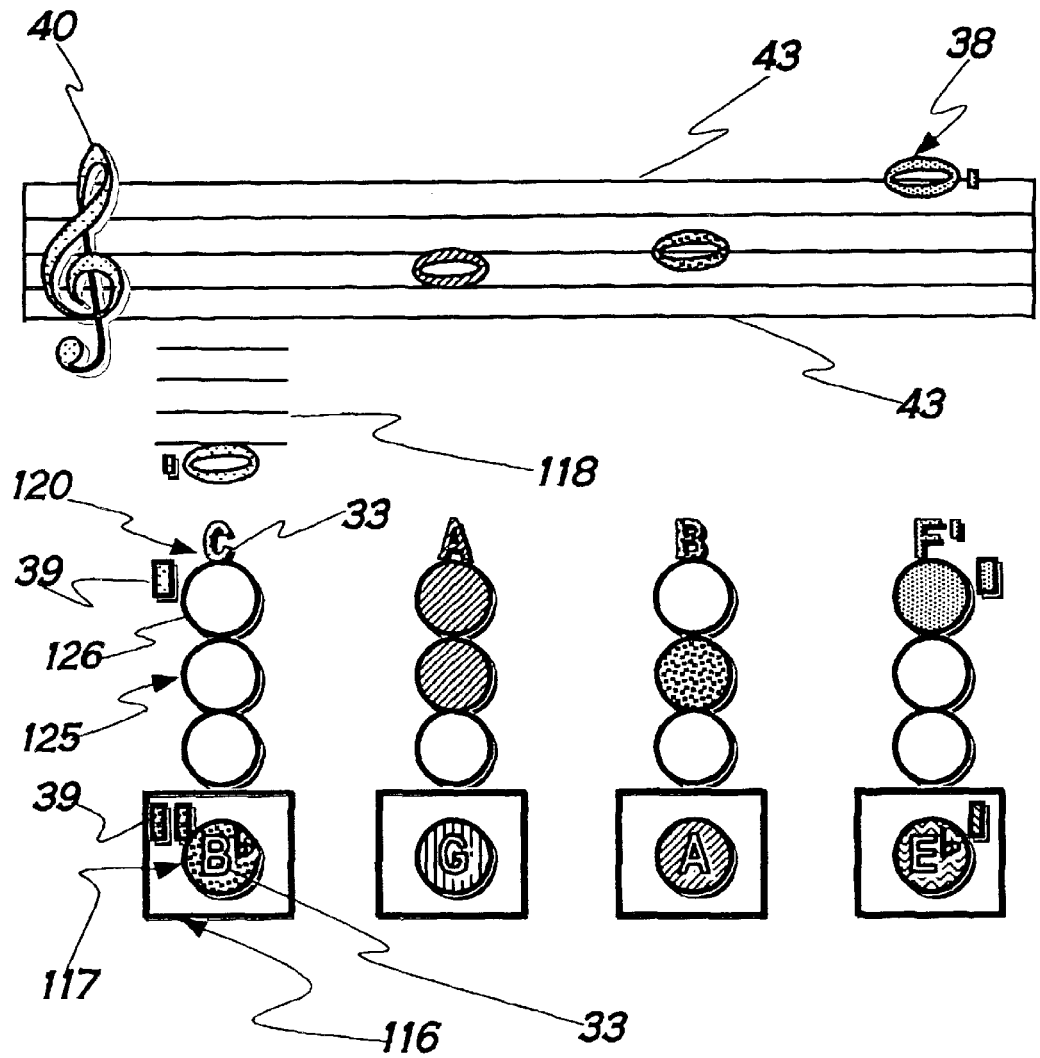
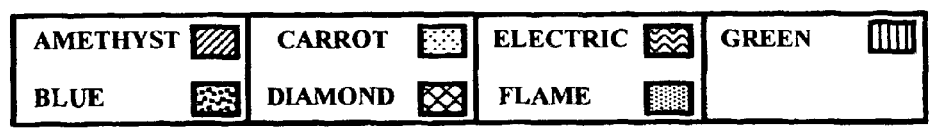

MUSIC TEACHING SYSTEM AND METHOD

This application claims the benefit of Provisional Application No. 60/222,740, filed Aug. 3, 2000.

BACKGROUND

1. Field of Invention

The present invention relates generally to music learning and, more particularly, to a music learning system for facilitating the learning of the structures of music and the playing of instruments.

2. Prior Art

Typically, the learning of music involves the memorization of standard musical composition structure and notation. The information derived therefrom is then applied to a musical instrument to enable the execution of a musical composition. Many prior art systems have been devised to facilitate this learning.

U.S. Pat. Nos. 6,057,501 and 5,540,132, issued May 2, 2000 and Jul. 30, 1996, respectively, to Hale for *Method and Apparatus for Teaching Musical Notation to Young Children* describes a method for identifying musical notation by matching each Western music alphabet not with a different object to which has been assigned a different distinct color. As has been done before in other systems such as those cited hereinafter, the objects in this invention are named such that each of their names begins with a different letter of the musical alphabet. This beginning letter is used to connect each object to a musical note via the beginning letter of the object name and the musical note name. The objects are then used to connect the notes to selected distinct colors that are not purposefully named such that their names begin with the common letter. The objective is to associate color to the notes in order to expedite the learning and remembering of the notes. As part of the preferred embodiment of the invention, and as another mnemonic device to aid in the remembering of the objects, each of the objects has been developed into a 3-dimensional puppet cartoon character that is endowed with a distinctly identifiable personality characteristic to assist in remembering the objects.

This system, designed to aid in making easier mental connections between note locations on a keyboard and note symbols on a staff, requires the student to memorize an unnecessary layer of association toward that goal. First, one must memorize the names of the objects, then the names of their assigned colors, and then make a connection to the notes via the objects, since it is the objects that have the direct connection to the notes via their names. In the preferred embodiment of the invention, there is evidence showing how any extra connecting layer can inadvertently broaden the opportunity to create confusion. For example, the object names presented often do not readily provoke a mental image of the colors they are paired with, and further, can even lead the student astray. For example, the object "grapes" is paired with "green," yet "grape" is a color usually associated with "purple," which also happens to be another color of the preferred embodiment. Then there is the object "fruit," which is paired with "purple," and yet "fruit" naturally provokes an association with many different fruit colors. Another object, "Easter egg," represents "yellow," yet "Easter egg" customarily has an association with an arbitrary myriad of colors, since individual Easter eggs are often colored with more than one color.

The other objects of Hale's preferred embodiment, beyond those cited in the previous paragraph, relate fairly well to the colors they are paired with, but there still remains an unnecessary extra layer away from the goal of precisely connecting note names to note symbols on musical compositions and to note locations on instruments via color. For even if all the objects always provoked the mental image of the proper color, it still would be necessary to remember which color goes with which object though the colors have no precise connector to the objects, e.g., "brown" is paired with "donut" which is paired with "D"; this can be confusing. To add to the inadvertently created confusion, there are two colors named beginning with the letter "B," "brown," and "blue"; these, and other such incidental associations that might occur from such randomly named colors, must be discounted.

Further, Hale's system is somewhat unwieldy in that it apparently requires the creation of new objects for each note. For example, there is a "crabapple" cited for middle "C", and a "cherry" for the "C" above middle "C". In addition, Hale suggests, without being specific, that sharps and flats be represented by some variation of these object shapes. Because there are no examples given beyond the eight objects described, this would mean, for example, that for the entire piano keyboard one would have to create and memorize eighty more, appropriate, colored objects that, as specified, occur naturally in the color represented, beyond the eight described. This would be even more complicated if one keeps to a theme and these eighty new objects must be fruits, in keeping with the preferred example. Still further, it is stated that musical scores could be created with the colored note symbols, and that note locations on instruments may be marked with colored scale letters. There is, however, no provision for the representation of a particular note's pitch change on these colored note scores and instrument note location markers. For example, one must identify which "red" "C" note is being represented on a score or an instrument, the "crabapple "C"," the "cherry "C"," or one of the other "red" object "C"'s that must be created and remembered, etc. Finally, Hale describes, but does not demonstrate, how the note location markers might be applied to an instrument.

U.S. Pat. No. 1,526,547, issued Feb. 17, 1925 to Hughey for *Instruction Set* describes a system set up as a chart on which is represented a keyboard, and three staves. Distinctly different colored note location markers, in the form of stickers representing each of the seven natural notes, are placed on the represented keyboard white keys. No solution for identifying the sharp/flat black keys is shown. The stickers are each then matched by color to note symbols on the staves of the chart. On the first staff, the note symbols are identified by colored thumbtacks on which are hung same-colored bird images; on the second staff the note symbols are identified by colored thumbtacks alone; and on the third staff the note symbols are identified by colored standard note symbols that have accompanying strips which graphically portray note time durations.

Hughey's system is more layered than necessary in that one must learn both arbitrary color and object names, and match them to the note letter names of music. Other than being colored the same, there is no direct connection between the colors, objects, and notes such as a common beginning letter of the beginning of each of the names of the colors and/or objects and each of the note letter names. The system also makes no provision for differentiating the specific pitch of a particular note so that it is clear which colored note location marker on the keyboard matches, which colored note symbol on a staff. Hughey's system is also limited to use as a music instruction chart, making it rather inflexible, and not readily adaptable into other forms such as more sophisticated manifestations that would appeal to adults, or to usage on a variety of instruments in combination with a variety of musical composition manifestations. Finally, Hughey's system does not use color to identify other musical structures such as the compositional keys, or sharps and flats of key signatures.

U.S. Pat. No. 5,546,843, issued Aug. 20, 1996 to Degaard for *Piano Key Identification System* describes a system that marks piano keyboard keys each with a note location sticker that relates the keyboard key to note symbols on a grand staff. The sticker has on it a representation of a five line staff, a clef symbol, a whole note, the note's letter name, and the solfege for the note. This system is limited to use with a keyboard, or an instrument with large note locations, since the note location stickers must be large enough to legibly accommodate the required information as described above. The system is also limited in that it uses no color. Its duotone black and white doesn't differentiate elements addressed by the system in the way color does.

In Degaard's system the note location stickers show whole note symbols at what appears to be the beginning of the staff because of the note symbol's proximity to the clef sign. This is somewhat misleading when one is attempting to pair a note key marked with one of the stickers to a note symbol on a musical composition, since most note symbols on a musical composition are not next to the clef sign. Further, Degaard's system seems to be restricted to the key of "C" or "A" minor. For example, the whole note symbols on the instrument note location stickers are shown always sitting next to a clef sign that shows no sharps or flats of a key signature, thus indicating the key of "C" or "A" minor. And, again, as represented, the system can be used only for the compositional key of "C," since the "DO" solfege term of the instrument note location stickers is on the "C" note key, "RE" is on the "D" note key, etc. For this system to work for another compositional key of, say, "D," "DO" would need to be on the "D" note location marker, "RE" on the "E" marker, etc. Finally, the instrument note location sticker description makes no allowances for ledger notes other than the "middle C" shown, as the stickers are described as having only five staff lines.

U.S. Pat. No. 2,447,213, issued Aug. 17, 1948 to Sledge for *Musical Educational Appliance* describes an apparatus designed to teach the simple rudiments of music. On this apparatus, a grand staff and keyboard are represented. The grand staff represented has small, movable, 3-dimensional representations of houses sitting at the end of each of the staff lines. These "houses" are each colored a different color, and on each roof is applied the note letter of the staff line the "house" marks. The note letters and colors of the "houses" are; "C"—red, "D"—orange, "E"—yellow, "F"—green, "G"—blue, "A"—purple, and "B"—white.

In addition to the "houses" described in the last paragraph, flat, 3-dimensional, movable pieces, in the shape of animals, are provided, to be placed on the staff lines as simple representations of note symbols. These animal shapes are named such that the first letter of each of the names matches one of the seven letters of the musical alphabet. The animal names, and their matching musical letters are; cat for "C," dog for "D," elephant for "E," fox for "F," goose for "G," ape for "A," and bear for "B." A label on each animal image contains the letter that matches the animal name to the musical alphabet letter. This label letter is colored to match the color of the "house" at the end of the staff line. Movable, 3-dimensional note symbols are also provided so that they may be used in place of the animal image after a student has learned the placement of the animals on their proper staff lines.

Sledge's invention is limited in that it is configured as a fairly rudimentary musical instruction device. In addition, it is rather layered, which complicates the route to the intended objective of teaching the basic fundamentals of music. For example, two different sets of objects, the "animals" and the "houses," as well as their arbitrarily-named colors, and their relationship to their musical alphabet letter name must be learned. Further, a theme involving towns and streets renders the system even more intricate.

Some of the confusion inadvertently created by the system can be seen in the relationships set up between the note names, the arbitrarily named objects, and the particularly named objects. The following are particularly distracting. The "G" note is paired with the blue house, and the goose, which is usually thought of as "white." Thus, not only is the color assigned to the note not reinforced, but the mind must relate "G" to "b," for "blue," to "g" for "goose" while dismissing "w" for "white." Other distracting examples are: the "B" note paired with the "white" house, and with the "bear," which is usually thought of as "brown"; the "F" note paired with the "green" house, and the "fox," which is usually thought of as "red"; and finally, the "E" note paired with the "yellow" house, and the "elephant," which is usually thought of as "gray." Even if the colors matched that of the animals named, the fact that the colors' names begin with a different letter than that of the animal name and the note letter creates confusion.

In addition to the difficulty of relating objects, notes, colors, and other "town" elements, Sledge's invention makes no provision for identifying specific pitch. The invention is primarily a device for teaching the basic lines of the staff and the natural notes as it doesn't address sharps, and flats, the staff space note positions, or any other aspects of musical structure.

U.S. Pat. No. 1,201,769, issued Oct. 17, 1916 to Siegel for *Toy Piano* describes a system using melody card charts that are paired with note location stickers on a toy keyboard. A different animal black and white sticker is placed on each of the keyboard keys to identify each key note. The animals of these stickers are arranged on the melody card charts to create a melody when the animal-stickered keys of the keyboard are played in the order presented on the cards.

Siegel's system is rather rudimentary, and is apparently intended only for a very limited keyboard, as no sharps, or flats are indicated on the keyboard. In addition, since one must learn a different animal for each key, the system is unwieldy, especially if applied to a standard piano keyboard. Finally, Siegel's system has very little relationship to standard compositional music. As stated, the keyboard represented has no sharps or flats, and the composition has no staves, or note symbols, or other features of standard musical compositional structure. This simplification could actually lead one astray from the goal of later musical proficiency since one is learning only note names and tones without any sense of standard musical structure.

Because of certain omissions in the prior art, as partly elucidated in the examples described, there remains a need for a music learning and playing coding system that utilizes wholly reiterative mnemonic components in conjunction with specific pitch indicators for enabling more efficient learning and playing of music.

Definitions

1. Note: A general term used to refer to a tone or Note Letter Name (see "2" below) or Note Symbol (see "4" below)—where these are clearly understood.
2. Note Letter Name: A, B, C, D, E, F, or G.

3. Note Tone Representation: The representation of the actual sound produced by an instrument. Note Tone Representations include Note Symbols (see "4" below) and both Note Location Identifiers and Note Formation Identifiers (see "5" & "6" below).
4. Note Symbol: A conventional note symbol on a staff, ex: ♩, or other note symbol representing a note, including lyric syllables, letters, and dots that are used on alternative compositional structures.
5. Note Location Identifier: A marker that is used to physically identify where a note originates on an instrument. This identifying is done by marking the location where the note is originated (by striking; stopping; fretting; exhaling or inhaling in a hole, and the like) on the instrument.
6. Note Formation Identifier: A diagram showing the configuration of how a note is originated via: the grouping of keys and holes; valves; slide position plus partial, if necessary; and the like. The diagram is usually placed directly beneath a Note Symbol of a staff, or Note Symbol of an alternate Musical Composition structure.
7. Stylized Image: The stylized animals, or other images that are used to enhance identification of a note tone that is represented by a Note Symbol, Note Location Identifier, or Note Formation Identifier. The image may be derived from fauna, flora, or objects.
8. Musical Composition: A visual production of music using Note Symbols of a multitude of kinds.
9. Staff: The five lines and spaces of the "staff." "Staff" is the preferred singular form, and "staves" is the preferred plural form. "Staff lines" is used when referring to the lines of the staff, or staves, since "staff" or "staves" may refer to the inclusion of all the other elements of the staff, or staves, including the spaces, clef symbol, time signature, etc.
10. Pitch Marking: Describes the entire system of octave group pitch marking of the system, including reference to the "middle C" octave group, which is marked with no pitch marks.

SUMMARY

The present invention is an innovative system and method for facilitating the learning and playing of music. The system uses coding of a multitude of entities to enhance recognition and learning of musical structures, and to aid in a more rapid mental connection between note symbols on musical compositions and the source of their production on instruments.

The system is a more efficient system, especially in its preferred embodiment, than those previous to it of similar genre in that in the preferred embodiment it uses fewer elements, only the seven names colors, plus octave group pitch marking, as the basic foundation of the system. And while the system is easy to learn, its very simplicity facilitates a sophisticated flexibility in its application.

As stated above, the preferred embodiment of the system uses seven particularly named colors for the color coding of the system. To create the color coding system, these colors are each given a name beginning with a different one of the seven letters of the musical alphabet, and are each paired with the musical note of the same letter name. This enables the color-coded identification of the seven basic foundation natural notes of western music. To complete the identification of the twelve fundamental notes of music using the color coding system, sharp (#), and flat (b) symbols are added to each of the natural notes' representations, whether that be a note letter, a note symbol on a musical composition, or a note location, or formation identifier of an instrument, or other representation.

In the preferred embodiment of the system, a pitch marking system is manifested as pitch marks in the form of vertical dashes that are placed to the left or right of a note representation to indicate the octave group location of the note represented.

In the preferred embodiment, the pitch marks are assigned to the octave groups such that the notes of the base octave group of the pitch marking system, which is the "middle C" octave group, each has no pitch marking, while each of the other octave groups' notes has pitch marking that increases in number as their octave group radiates out farther from the base octave group in pitch. Thus, the notes of the first octave groups below and above "middle C" each has one pitch mark, the notes of the second octave groups below and above "middle C" each has two pitch marks, et cetera.

Another preferred embodiment aspect of the system is the use of the color coding to code components of both standard and alternative visual musical composition structures so as to identify the compositional key of a musical composition. This color-coding aids in more rapid recognition of compositional keys and in learning of the key signatures of music, as well as in easier reading and playing of musical compositions.

Still another feature of the preferred embodiment showing the use of the color coding is the coloring of the sharps and flats of key signatures to aid in the recognition of those notes sharped and flatted in key signatures, and in the recognition of each of the key signatures by its color pattern in conjunction with the staff coloring for the composition key.

In addition to the coloring and pitch marking of the system, another aspect that aids further in the learning of music is the use of stylized images in the form of fauna, flora, and objects that are also named as the colors are, such that their first names each begin with a letter of the musical alphabet. These stylized images are particularly useful for the teaching of children because they can be animated, and thus add excitement. A preferred embodiment of the stylized images is presented in the detailed description of the system.

These and other aspects of the system will become apparent to those skilled in the art after a reading of the following description and a review of the figures thereof.

DRAWINGS—FIGURES

FIG. 2 shows the basic set of note location identifiers for natural notes in the preferred embodiment for keyboard using the "middle C" octave group identifiers.

FIG. 8 shows examples of note formation identifiers in the form of fingering diagrams with a sounded note identifier for trumpet.

DETAILED DESCRIPTION—INCLUDING THE PREFERRED EMBODIMENT

Figure 1:
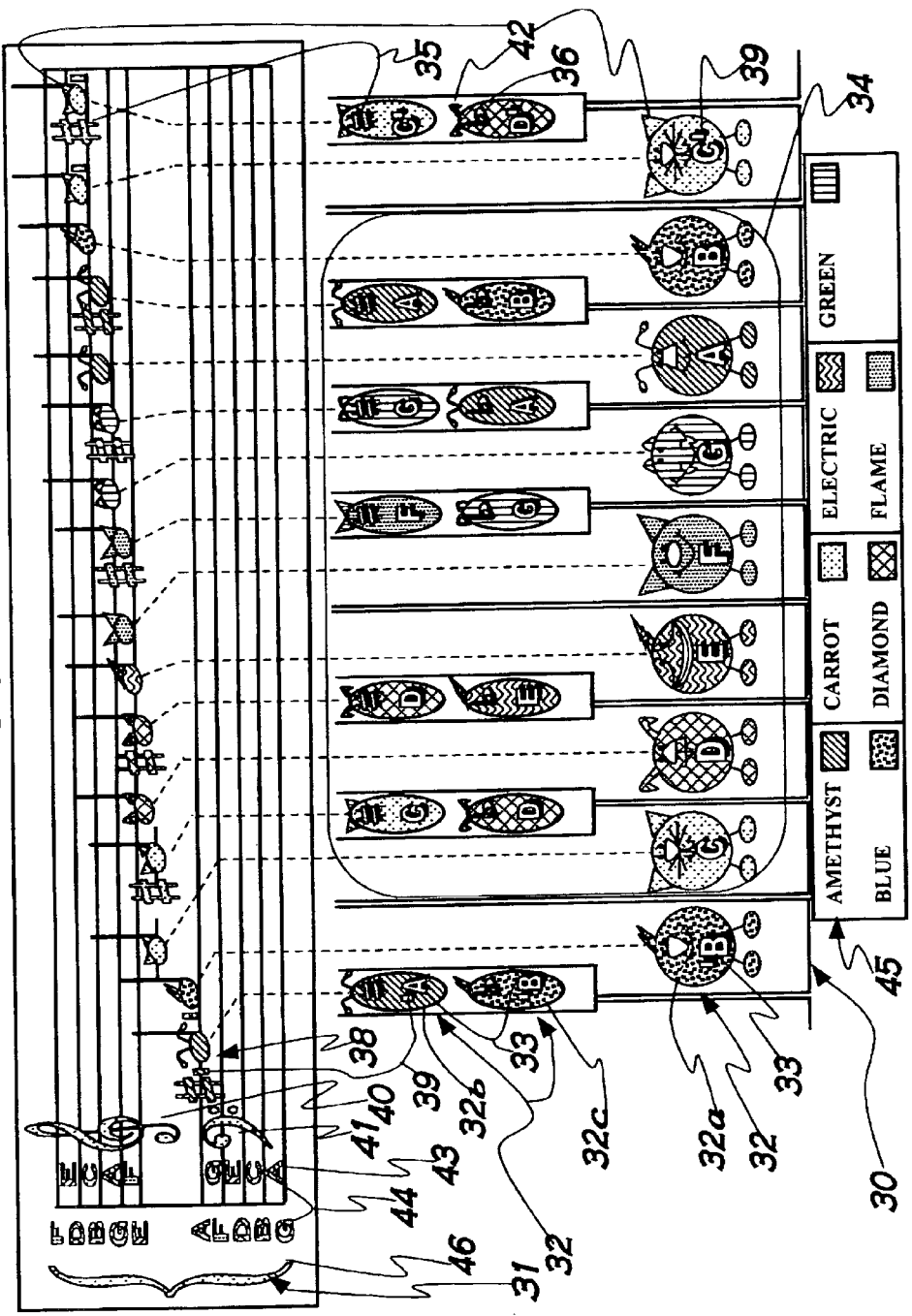
FIG. 1 shows an example of a musical grand staff with note symbols that are paired to note location identifiers in the preferred embodiment on a plan view of a piano keyboard.

The present invention is a coding system for the learning and playing of music. This coding system is applied to a multitude of entities, including the structures of visual musical compositions, as well as to the note symbols that represent tones in those visual musical compositions. Further, the coding system is applied to the instrument note location identifiers and note formation identifiers that represent those note tones' production. The purpose of the system is to aid the user in more rapidly recognizing, and therefore learning, musical structures, as well as more rapidly making the connection between a note represented on a musical composition and the exact manner of production of that note on an instrument.

The coding is constructed from particularly named colors, and a pitch marking system that are used both together, and separately, to aid in more rapid recognition of musical structures, as well as in the pairing of note symbols on visual musical compositions with note location identifiers, and note formation identifiers of instruments to enable the production of musical tones.

More explicitly, in the preferred embodiment the particularly named colors of the coding system are named such that each of the colors' names begins with a letter of the musical alphabet; A, B, C, D, E, F, G. In the preferred embodiment of the system, there are only seven colors that act as the basic foundation of the basic-color coding system. Each of these colors is paired with one of the seven notes of the musical alphabet via the common letter. These colors and their matching musical notes are; "amethyst" for "A," "blue" for "B," "carrot" for "C," "diamond" for "D," "electric" for "E," "flame" for "F," and "green" for "G." This pairing, by reiteration of the common letter of the color and the note, acts as a strong, efficient mnemonic device that enables rapid association of the color to the note, especially since there are no intermediate devices between the color and the note that must be remembered in order to make the connection. For the completion of the color-coding system for the twelve basic notes of Western music, sharp (#), and flat (b) symbols are simple added to the color-coded natural note representations.

Following the pattern described in the last paragraph for sharp and flat notes, the sharp and flat note location and formation identifiers for instruments are each assigned the color of the natural note they represent as being sharped, or flatted. Thus, a sharp/flat note is represented on an instrument by two different color identifiers. For example, an "A#/Bb" note would have two note location or formation identifiers. Under the preferred embodiment, the "A#" would be colored "amethyst," and the "Bb" would be "blue." Again, these sharp and flat notes are differentiated from their natural notes by sharp (#), and flat (b) symbols. The note symbols on a staff or other composition structure is treated in like manner.

To further define the universe of Western musical notes, the pitch mark coding system of the system identifies the particular octave group of a note. An octave group consists of the twelve consecutive basic note tones of music. These notes are termed as "octave group" because each note of a particular octave group is the last, or eighth, note when counting the notes of octave intervals from like notes of the octave groups next lower or higher in pitch to the particular octave group.

In the preferred embodiment the designated octave groups are "C" octave groups, meaning that the first note of an octave group is a "C"; therefore the notes included in an octave group of the preferred embodiment are the twelve fundamental note tones of music between "C" and "B," thus: "C, C#/Db, D, D#/Eb, E, F, F#/Gb, G, G#/Ab, A, A#/Bb, and B." The "middle C" octave group is designated as the base octave group.

In the preferred embodiment of the system, the pitch marking coding is manifested as a vertical dash pitch marking system for delineating the octave group location of notes on musical compositions and on instruments. These dashes are placed next to the note symbols on musical compositions, and note location identifiers and note formation identifiers for instruments. They indicate the "C octave group in which a note is located. The base octave group, or octave group of reference, as stated previously, is the "middle C" octave group. In the preferred embodiment, the notes of this "middle C" octave group have no pitch marks assigned to them, while the notes of the other "C" octave groups are identified by pitch marks, starting with one pitch mark for the first "C" octave above, or below the "middle C" octave group. Pitch marks are added in counting, sequence fashion, forming a particular pattern as the "C" octave groups radiate farther from the "middle C" octave group. To indicate the "C" octave group notes that are lower in pitch than the "middle C" octave group, the pitch marks are placed on the left side of the note symbols of the staves, or of other musical composition structures, and also of note location and formation identifiers of instruments. To indicate the "C" octave group notes that are higher in pitch than the "middle C" octave group, the pitch marks are placed on the right side of the note symbols of staves, or of other musical composition structures, and also of note location and formation identifiers of instruments. In the particular case of dotted notes, the right side pitch marks are placed to the right of the dot.

Another feature of the preferred embodiment of the system incorporates stylized images as an added mnemonic device to enhance the recognition and remembering of the note tones represented by note symbols on musical compositions and note location and formation identifiers of instruments. The images are named such that the first letter of each of their names is a letter of the musical alphabet, just as the coding colors described already. In general, these images may be of fauna, flora, or object source, and any of these sources may be used for images of the system. In the preferred embodiment represented here, the stylized images are of animal variety. The names of these and the colors of the system, as well as the note to which they are both related, are illustrated in Table 1 below.

To further aid the user in recognizing, remembering, and differentiating the animal images and their names, another preferred embodiment component, distinguishing marks on the images, is utilized. These marks, as seen in Table 1, include stylized ears, feather tuft, and other appendages. These may be applied both to the note symbols of the musical compositions and to the note location and formation identifiers of musical instruments, thus creating another visual matching element between the musical composition and instrument that enables the playing of tones. This same distinguishing mark method may be applied when using other images.

TABLE 1

Example according to the preferred embodiment that demonstrates the association of musical note with color and stylized animal image.

| Note | Color Name | Stylized Animal Image Name | Color Name + Stylized Animal Image Name | Stylized Animal Image |
|---|---|---|---|---|
| A | Amethyst, a bright purple hue | Ant | Amethyst Ant | |
| B | Blue, a bright blue hue | Bird | Blue Bird | |
| C | Carrot, a bright orange hue | Cat | Carrot Cat | |
| D | Diamond, a bright gray hue | Dog | Diamond Dog | |
| E | Electric, a bright yellow hue | Eel | Electric Eel | |
| F | Flame, a bright red hue | Fox | Flame Fox | |
| G | Green, a bright green hue | Gator | Green Gator | |

According to the preferred embodiment of the system, the structural components of the musical staves of a musical composition, excluding the note symbols, are colored to represent the composition's key color. This is achieved by coloring selected parts of the structural components the same color as that assigned to the note of the same name as that of the key of the musical composition. This special coloring of the stave structural components facilitates ready identification of the key of a composition, even before one has learned to read key signature. The structural components that are colored include; the brackets, staff lines, clef symbols, time signatures, bars, rests, dynamic symbols, and the like. One structural component of the staves that is not colored the compositional key color is the key signature. It is treated in a special manner designed to further inform a user of the system. This is described in the next paragraph.

In the preferred embodiment, the key signature is represented with its sharp or flat symbols (#, b) each colored the color of the note that is being sharped or flatted. For example, if the key of a musical composition is "D," which has an "F#, C#" key signature, the "F#" note sharp symbol is colored "flame," and the "C#" note sharp symbol is colored "carrot." This special coloring enables the key signature notes to be recognized efficiently.

Referring now to the drawings in general, the illustrations are for the purpose of describing a preferred embodiment of the invention and are not intended to limit the invention thereto.

Figure 3:
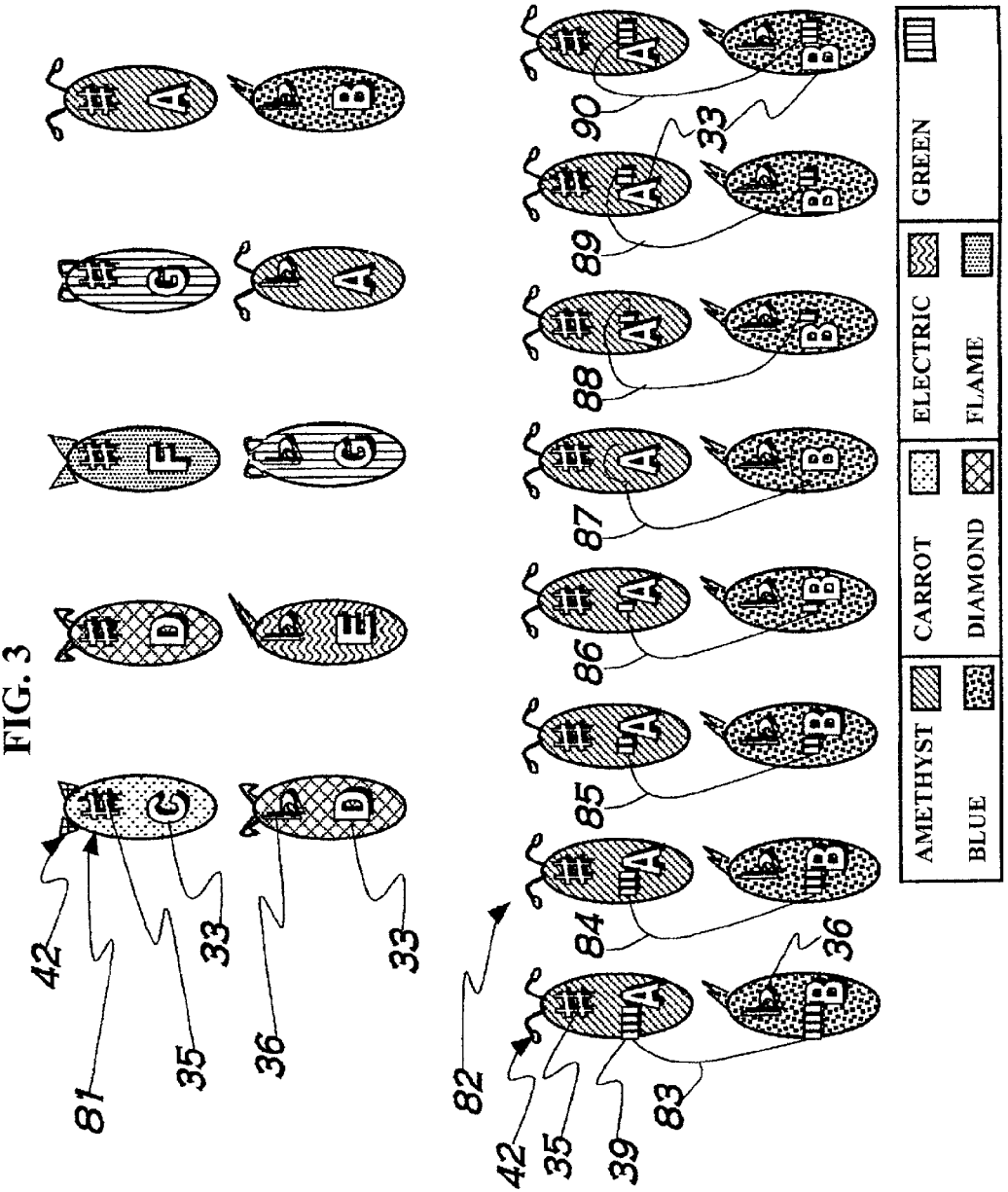
FIG. 3 shows the basic set of note location identifiers for sharp/flat notes in the preferred embodiment for keyboard. The figure also shows how the pitch marking system works using the sharp/flat note location markers.
Figure 4:
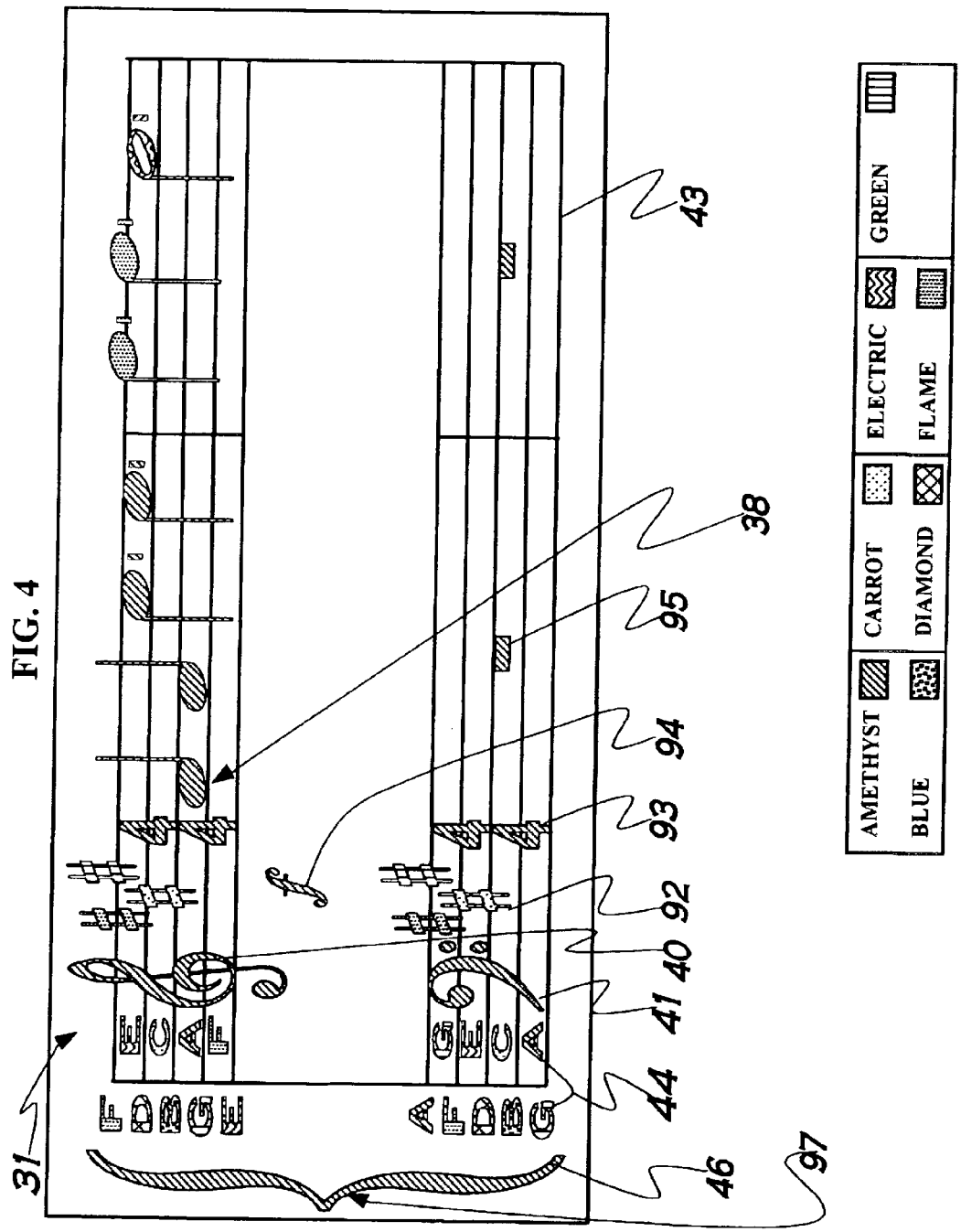
FIG. 4 shows an example of a musical grand staff, illustrating the coloring of time signatures, rests, and dynamic symbol to define the composition's key color. Also shown is an example of the special coloring of the key signature.

FIGS. 1 through 4 illustrate the preferred embodiment of the system, including note location identifiers for a piano keyboard (30), musical composition note symbols (38), and a color-coded musical grand staff (FIG. 1, 31; FIG. 4, 97).

FIG. 1 shows an example of the note location identifiers (32) paired with an example of a standard musical grand staff (31) which has its structural components colored in the compositional key color which is the color assigned to the note of the same name. In this case, the compositional key is "C," and since the color designated to "C" in the system is "carrot," the components are colored "carrot." These components include the treble clef (40), bass clef (41), staff lines (43), bracket (46), and time signatures (47).

Other examples of components of the staff that are designated in the system to be colored the composition key color are shown in FIG. 4. These include another example of the time signature (93), the dynamic symbol (94), and the rest symbol (95). Since the composition key on the grand staff of FIG. 4 is "A," all of these elements are colored "amethyst." Additionally, an example of the special coloring of the key signature is shown, (92). As has been described, the key signature's sharp/flat symbols of the preferred embodiment of the system are colored the color of the note they represent as being sharped or flatted. In this case, the "A" key signature has three sharps, "F, C, & G"; therefore, these are colored "flame," "carrot," and "green," respectively.

In both FIGS. 1 and 4, examples of the preferred embodiment for the grand staff shown the lines and spaces of the staves marked with their musical alphabet letter name, and with each of these letters colored its note color, (44).

FIG. 1 presents the preferred embodiment for note location identifiers for piano keyboard in the seven preferred color (45), each with its proper pitch marking (39). And note letter name (33). Each sharp/flat identifier is represented with its particular sharp (#) (35), or flat (b) (36) symbol.

The natural, or white key, notes have one identifier each, (32a), and the sharp/flat, or black key, notes have two identifiers each, (32b & 32c respectively). The sharp/flat keys are identified this way to demonstrate their relationship to the natural notes which they are sharping or flatting. Thus, for example, the sharp/flat black key note for "C#" and "Db" has an identifier which is colored both "carrot," just as is the natural "C" note it sharps, and "diamond," just as the "D" note is flats.

Each of the identifiers is further differentiated by particular pitch marking which identifies the octave group in which the note of a particular identifier is located. FIG. 1 shows an example of the identifiers, starting from the "A#/Bb" black key identifier for the note located in the "C" octave group just below the "middle C" octave group, and continuing to the "C#/Db" black key identifier for the note located in the "C" octave group that is just above the "middle C" octave group, (34). In this sampling of identifiers, it can be seen that the "middle C" octave group identifiers of the system have no pitch marks. The "middle C" octave group is the base octave group of the pitch marking system. Both below, and above the "middle C" octave group, two notes are shown. Each of the two below, a sharp/flat black key, and a natural white key, has one pitch mark (39) to the left of its note letter name, indicating that its note is in the first "C" octave group below the "middle C" octave group. Each of the two identifiers above, also identifying a sharp/flat key, and a natural key, has one pitch mark (39) to the right of its note letter name, indicating that each resides in the first "C" octave group above the "middle C" octave group.

Examples of the complete pitch marking system clearly revealing the pattern of the pitch marking are shown in FIGS. 2 and 3. FIG. 2 shows the system applied to the natural note location identifiers, (63), and FIG. 3 shows it applied to the sharp/flat note location identifiers, (82). Continuing with the premise of the pitch marking system explained in the last paragraph; each of the note location identifiers for both the natural and the sharp/flat notes has a pitch mark (39) added in counting, sequence fashion as the note each represents is located in a "C" octave group farther below or above the "middle C" octave group, which is, as stated, the base octave group. Thus, as is shown in FIG. 2, using the note location identifiers for the natural "C" note for the example, the identifier for the natural "C" note in the base octave group has no pitch marking, (72); the first "C" octave group below the "middle C" octave has one pitch mark to the left of its note letter name, (70); the identifier for the natural "C" note in the second octave group below the "middle C" octave group has two pitch marks to the left of its note letter name, (68); the identifier for the natural "C" note in the third octave group below the "middle C" octave group has three pitch marks to the left, (66); and the identifier for the natural "C" note in the fourth octave group below the "middle C" octave group has four pitch marks to the left, (64). This same pattern is followed for the pitch marking to the right for notes located in octave groups above the "middle C" octave group, except that the pitch mark is placed to the right of the note letter name. Thus, the natural "C" note identifier in the first "C" octave group above the "middle C" octave group has one pitch mark to the right of its note letter name, (74); the identifier for the natural "C" note in the second "C" octave group above the "middle C" octave group has two pitch marks to the right of its note letter name, (76); the natural "C" identifier in the third octave group above has three pitch marks, (78); and the natural "C" identifier in the fourth octave group has four pitch marks to the right of its note letter name (80).

FIG. 3 shows the pitch-marking pattern to be the same for the sharp/flat note location identifiers, (82), as that explained above for the natural notes. In this example, the "A#/Bb" note identifiers are illustrated. Beginning again with the "middle C" octave group identifier: the "A#/Bb" note identifier in the "middle C" octave group has no pitch mark (87); the first #A#/Bb" note identifier below the "middle C" octave group has one pitch mark to the left of its note letter name, (86); the identifier for the #A/Bb" note two octave groups below the "middle C" octave group has two pitch marks to the left of its note letter name, (85); the identifier for the #A/Bb" note three octave groups below the "middle C" octave group has three pitch marks, (84) to the left of its note letter name; and the "A#/Bb" note four octave groups below the "middle C" octave group, has four pitch marks to the left of it note letter name, (83).

Continuing with the "A#/Bb" note identifiers of the previous paragraph, the same pattern is followed for the pitch marking for those "A#/Bb" notes above the base "middle C" octave group. Thus, the first "A#/Bb" note identifier in the octave group above the "middle C" octave group has one pitch mark to the right of the note letter name, (88); the note identifier in the second octave group above the "middle C" octave group has two pitch marks to the right of the note letter name, (89); and finally, the "A#/Bb" note identifier in the third octave group above the "middle C" octave group has three pitch marks to the right of its note letter name, (90). There are no sharp/flat notes in the fourth partial octave of the piano keyboard.

Referring again to FIG. 1, the note location identifiers (32) of the preferred embodiment for keyboard are manifested as colored stylized animal images that are names with names that start with the same letter as the note letter they represent. They are stylized to be uniform in appearance with a shape that is round, reminiscent of a whole note, with an oval variation for the narrow sharp/flat identifiers of the black keys on the piano. In addition, the animal image identifiers each has at least one unique head projection (best shown in FIG. 2 as 42a, 42b, 42c, 42d, 42e, 42f, 42g) that acts as a distinguishing feature (42) that aids in the identification and differentiation of one image from another, and, along with the color of each, in their pairing with the note symbols on musical compositions.

The basic set of note location identifiers for the natural notes, (50), is shown in FIG. 2; while the basic set of note location identifiers for the sharp/flat notes, (81), is shown in FIG. 3. The colors and names of the note location identifiers for the natural notes and their corresponding sharp/flat notes are the same, with only the sharp (#) or flat (b) symbols added to the natural note identifiers to create the sharp/flat identifiers. As has been shown in Table 1, the color and animal names are: "carrot cat" (51) for "C," and "C#"; "diamond dog" (52) for "D," "D#," and "Db"; "electric eel" (54) for "E," and "Eb"; "flame fox" (56) for "F," and "F#"; "green gator" (58) for "G," "G#," and "Gb"; "amethyst ant" (60) for "A," "A#," and "Ab"; and "blue bird" (62) for "B," and "Bb." The distinguishing features of these characters include stylized ears on the cat, (42c), dog, (42d), and fox, (42f); feather tuft on the bird, (42b); electric fin on the eel, (42e); head bumps on the gator, (42g); and antennae on the ant, (42a).

The aspects of the note location identifiers described above, especially their colors, pitch marks, distinguishing features, and sharp or flat symbols, are used in the system to match them with note symbols (38) on musical compositions. In the preferred embodiment, they are matched with standard musical note symbols that in the same manner have also been colored, pitch marked, sharped or flatted as needed, and are with, or without distinguishing features, depending upon the style of presentation. In FIG. 1, the note symbols (38) representing the same notes as the identifiers described already (32) have all of the elements delineated in the last sentence. These note symbols, as shown in the figure, are individually paired with the note location identifiers that have the same mix of these elements. Thus, for example, the "diamond dog D#" note symbol of the "middle C" octave group is paired with the "diamond dog D#" note location identifier of the "middle C" octave group. Since they are both in the "middle C" octave group, which is the base octave group of the system, each has no pitch mark.

Figure 5:
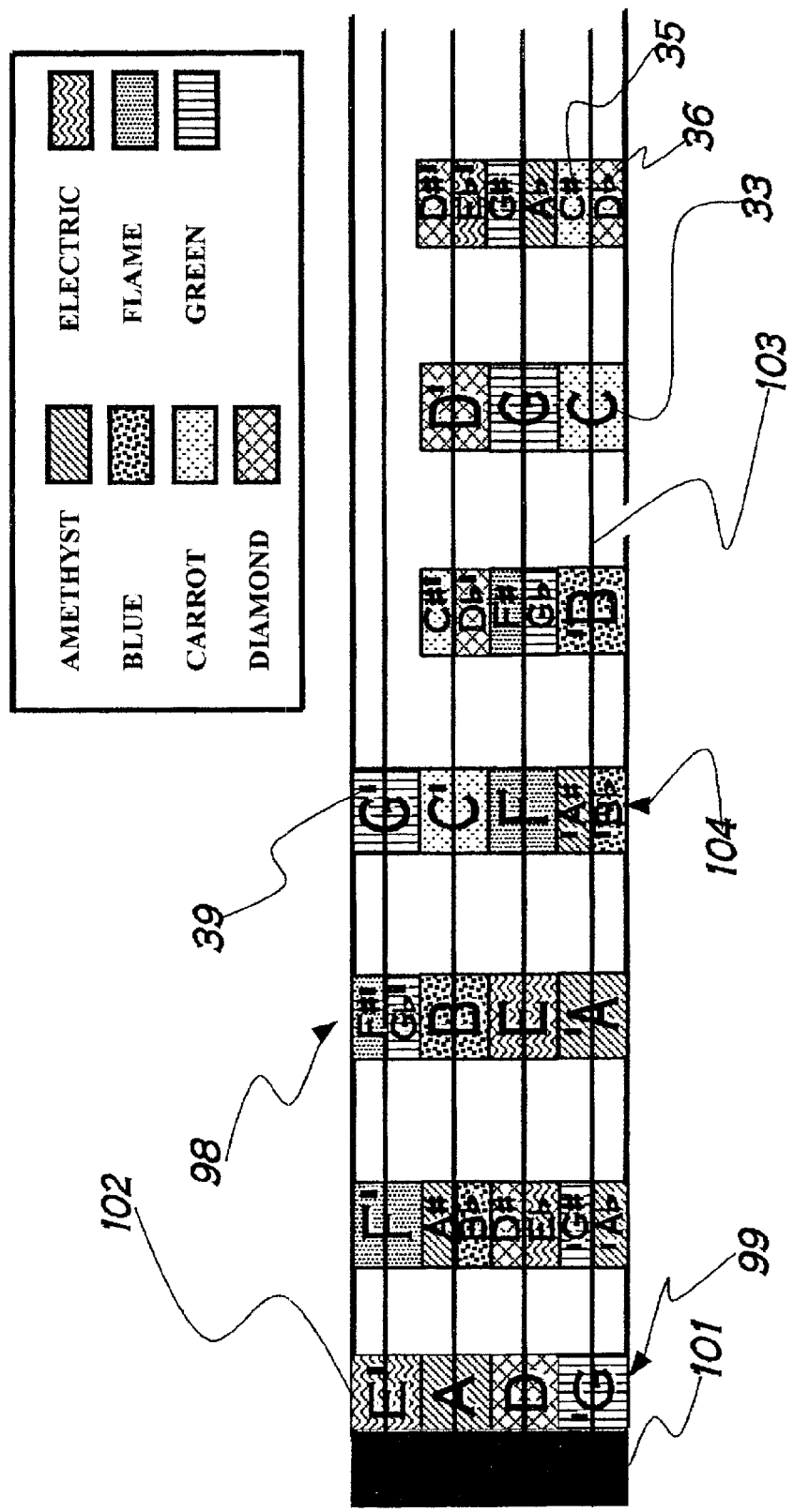
FIG. 5 shows examples of note location identifiers applied to a violin fingerboard.
Figure 6:
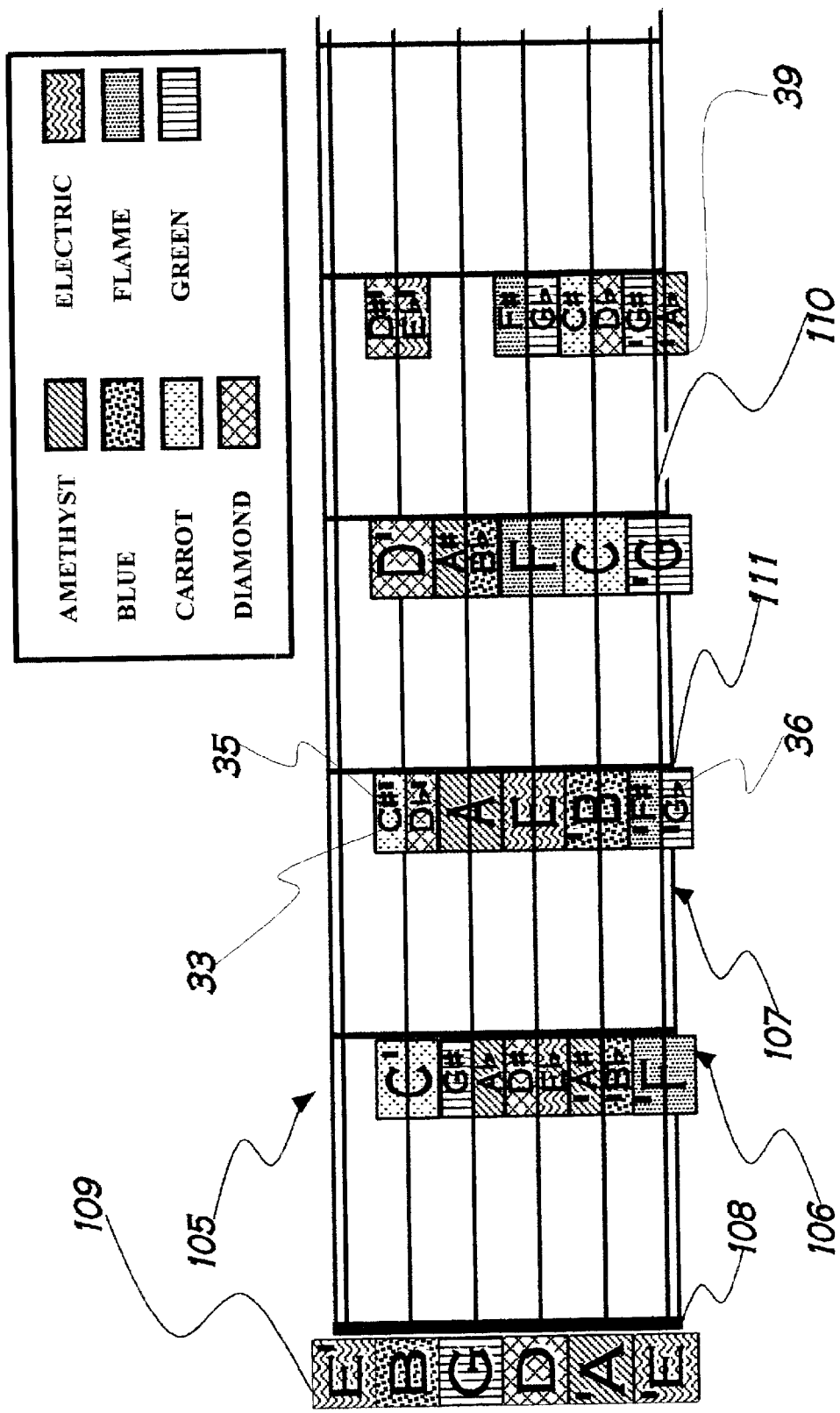
FIG. 6 shows examples of note location identifiers applied to a guitar fingerboard.

The structures of the system described for the keyboard are versatile and, with modification, allow the system to be used for a number of instruments. Examples that follow include embodiments for string instruments, woodwind instruments, brass instruments, and harmonica. FIGS. 5 and 6 show examples of the note location identifiers on string instruments. The concept used for these two instrument examples would work for most string instruments, with changes made for the number of strings, the beginning note of the first string, the tuning of the instrument, and whether an instrument has frets or not.

FIG. 5 shows an example of note location identifiers of the system for violin (98) applied to the violin fingerboard (99) of a four-string violin (103). Shown on the fingerboard example are note location identifiers for notes beginning with the lowest "G" note on the violin, which is the "G" note in the "C" octave group immediately below the "middle C" octave group, and rising to the "G" note which is in the "C" octave group immediately above the "middle C" octave group. The identifiers are manifested as rectangles that represent the location (104) where the notes identified are produced by "stopping," meaning the pressing of a finger on a string to produce a note using a bow, or by plucking. Each of these rectangles is colored its note color of the system, and is pitch marked (39) to its left, or right, where required, to indicate the "C" octave group in which it is located. In addition, each of the rectangles has its own note letter (33), and each that represents a sharp/flat note has its own sharp (35) or flat (36) symbol. In the example, open string notes are marked by rectangle identifiers (102) located adjacent to the nut (101) of the fingerboard.

FIG. 6 shows an example of note location identifiers of the system for guitar (105) applied to the fingerboard (107) of a six-string (110) guitar. Again, rectangles (106), as those described for the violin, are used for the shape of the note location identifiers, but for the guitar example they are applied at the frets (111). The frets are the places where the finger is pressed on a string to determine the string length so that a note tone may be sounded by the plucking or strumming of a string. Shown on the example of a guitar tuned in common key of "G" tuning are note location identifiers for notes beginning with the lowest "E" note on the guitar, which is the "E" note in the second "C" octave group below the "middle C" octave group, and rising to the "E" note which is located in the "middle C" octave group. The note identifiers of the open strings (109) are located next to the nut (108) of the guitar, in the same general manner as on the violin.

Figure 7:
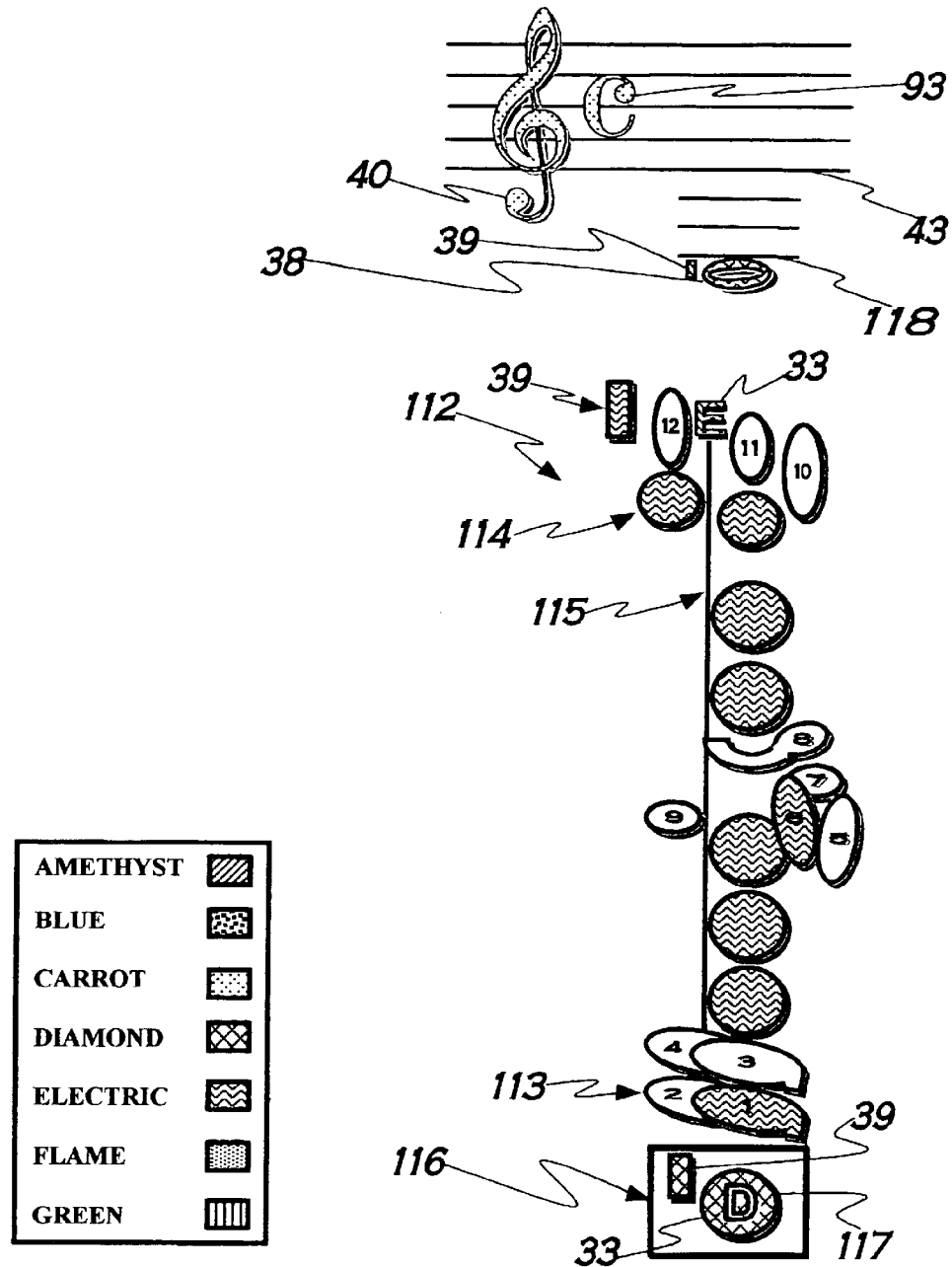
FIG. 7 shows an example of a note formation identifier in the form of a fingering diagram with a sounded note identifier for clarinet.

FIG. 7 shows an example of the note formation identifiers of the system for woodwind instruments. Because woodwinds and brass instruments use reconfiguration of keys and holes to form and produce different notes, it is not practical to apply note location identifiers directly to these instruments to identify the location where a note originates. Instead, note formation identifiers, in the form of fingering diagrams that represent the key and/or hole configurations, are applied directly to musical compositions, below the staff, as shown in FIG. 7, or next to other alternative musical composition structures that represent notes. The example shown in FIG. 7 depicts a note formation identifier fingering diagram solution designed using the system applied to a "Bb" clarinet woodwind. The fingering diagram (112) shown is similar to those that are customarily used, but with variations unique to the system.

In the fingering diagram example of FIG. 7, the twelve keys of the clarinet are marked by numbering, "1" through "12" (113), while the seven holes are unnumbered (114). To enable a player to identify the keys or holes to be fingered for producing a certain note, the diagram shows those key and hole representations that are to be activated for the production of that note, colored in the color assigned to the note. In the example, the note described by the fingering diagram is "E," therefore the keys and holes to be activated are colored "electric," the color designated by the system to represent the "E" note. To further identify the note that is to be configured, the proper pitch marking of the system is placed to the left or right of the fingering diagram in similar fashion to that shown previously for keyboard and string instrument note location identifiers. And like those identifiers, the pitch marking indicates the "C" octave group where the note is located. Therefore, since the "E" note of this example is in the first "C" octave group below the "middle C" octave group, it has one pitch mark (39) to the left side of the fingering diagram. The staff note symbol (38) that it is matched to is shown in the example on its composition-key-color-coded ledger line (118). The note symbol is also colored "electric," and has one pitch mark (39) to its left. The particular note formation identifier shown has a demarcation line (115) to indicate that note keys and holes to the left of it are on the back of the instrument.

Since the woodwind instruments are transposing instruments, meaning the note configuration read on the staff is different from that which is actually sounded, a "note sounded identifier box" (116) is provided that identifies the actual note played. In the example shown, the note actually sounded is a "D" note, therefore a "diamond"-colored disk (117) with a "D" note letter (33) on it is represented in the box. Since this "D" note is in the same octave group as the "E" note of its fingering diagram, it likewise has one pitch mark (39) to its left.

It is noted for elucidation, that embouchure is a part of the production of a sounded note for both woodwind and brass instruments. Embouchure encompasses the use of the structures of the mouth, plus the control of air exhaled into the instrument when producing a note. Embouchure is not addressed as part of the system at this juncture.

Figure 9:
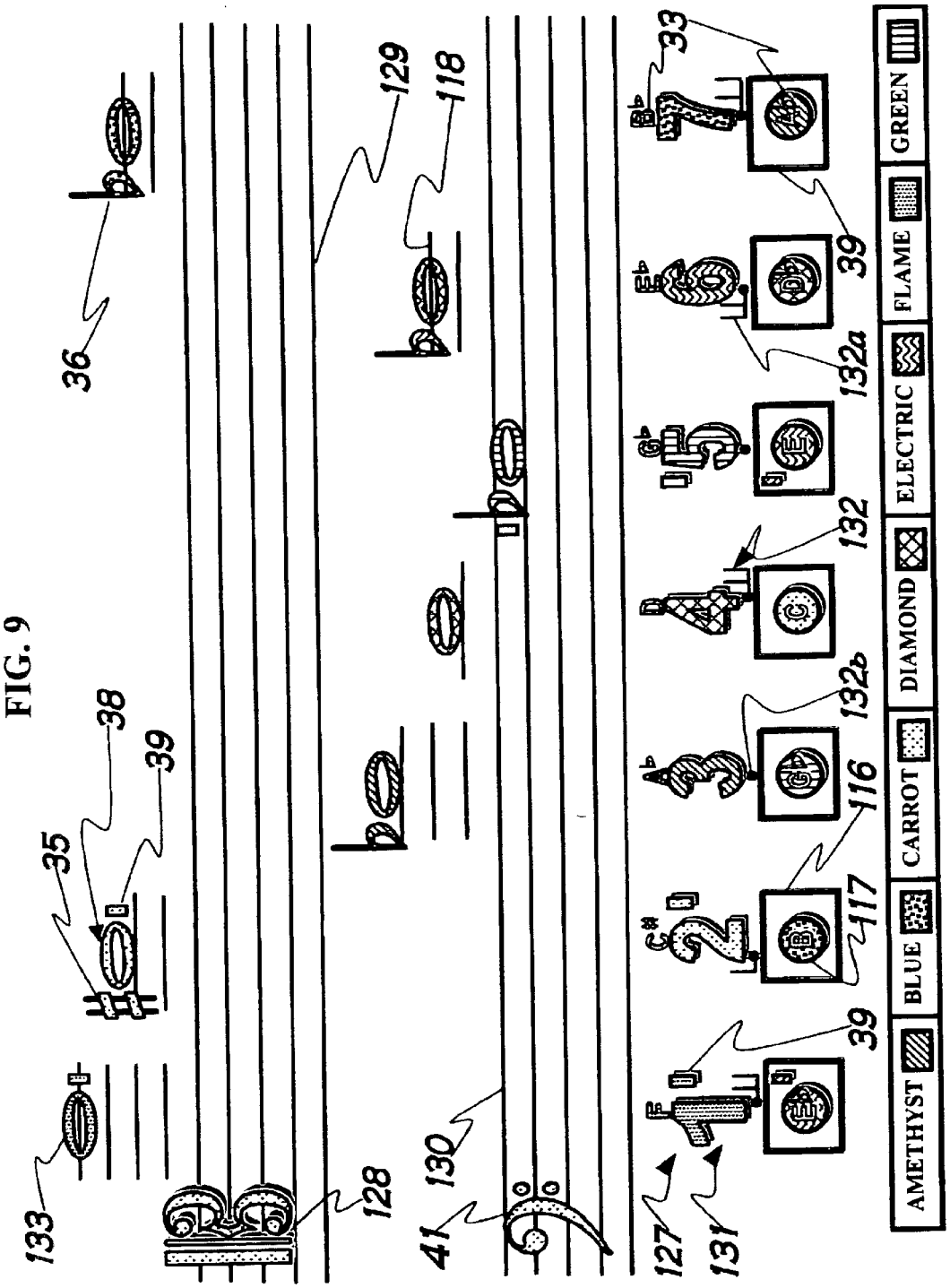
FIG. 9 shows examples of note formation identifiers in the form of slide positions plus partials with sounded note identifiers for trombone.

FIGS. 8 and 9 show examples of the note formation identifiers, in the form of fingering diagrams, for trumpet and trombone. The note formation identifier concept shown in the example for the trumpet could be applied to most brass instruments that use valves and embouchure to produce notes. This includes both cylindrically shaped instruments like the trumpet, and conically shaped instruments like the cornet. The not formation identifier concept shown in the example for the trombone could be applied to brass instruments that are conical in shape and which change the length of the instrument's tube by a slide mechanism similar to the trombone. Since all of these brass instruments are transposing instruments, as the woodwinds discussed above, a "note sounded identifier box" is provided in conjunction with the note formation identifiers to identify the actual note played by the instrument, versus the note indicated by the fingering diagram.

In FIG. 8, a plurality of note formation fingering diagram identifiers (120) for the "Bb" trumpet is shown. The identifiers consist of representations for the three valves of the trumpet (125), plus pitch marking (39), plus a note sounded identifier box (116), as well as the musical note letter names (33) of both the valve portion of the fingering diagram and the "note sounded identifier box." The valve representations indicate the valves that are to be pressed to produce a certain note. This is elucidated by coloring of the valves to be pressed in the color that the system assigns to the fingering diagram note that the valves are depicting.

In the first example fingering diagram of the four fingering diagrams shown, the note configuration to be produced is a "C" note. To form this note, no valves are pressed; only embouchure is used to produce the note. Therefore, in the example, only the outlines (126) of the valves are colored "carrot" to indicate that the note configuration to be produced is that particular "C" note wherein no valves are pressed. As can be seen in the other fingering diagrams, when a valve is to be pressed, the valve representation is colored solid. Continuing with the first fingering diagram, consistent with the system's left and right pitch marking that indicates "C octave groups" below and above the "middle C" octave group, one "carrot"-colored pitch mark (39) is placed to the left of the fingering diagram to indicate that the "C" note of the diagram is in the first "C" octave group below the "middle C" octave group. The actual note sounded when this "C" note configuration is activated, is the one identified in the "sounded note identifier box" (116). In this case, the sounded note is a "Bb" note located in the "C" octave group just below that of the valve fingering diagram "C" note. This "Bb" note is identified by the "blue"-colored" disk (117) and the "Bb" note letter (33). Its "C" octave group location is indicated by the two "blue" pitch marks (39) to its left.

Note formation identifiers for the "Bb" trombone are exampled in FIG. 9 in the form of slide position identifiers (127). These slide position identifiers consist of; a unique number (131) for each one of the seven base slide positions, a partial indicator (132), a note sounded identifier box (116), and note letters (33) for both the slide position note, and for the sounded note. The color and pitch marking system of the invention is applied to these.

In the first of the seven slide position identifiers shown in the example, the note represented is the "F" which is in the "C" octave group that is immediately above the "middle C" octave group. Therefore, its identifier has one pitch mark (39) to its right, just as its "flame"-colored note symbol (39) on the tenor clef (128) staff (129) which is colored the "carrot C" compositional key color as are the bass clef (41) and staff (130) also shown in FIG. 9. The number "1" (131) that represents the base slide position of this "F" note (133), as well as the pitch mark (39) that represents its octave group location, are both colored "flame" to represent the "F" note. The actual note sounded is an "Eb," therefore the disk (117) in the note sounded box, as well as its pitch mark (39) are both colored "electric."

The partial indicator (132), located at the foot of a slide position identifier number, directs the player to adjust the slide position in order to compensate for the slight abberation from exact pitch that occurs when the ratio between the cylindrical and conical portion of the slide of an instrument is changed when achieving certain slide positions, such as the "F" note position depicted in FIG. 9. There is a fairly consistent pattern to the minor adjustments that must be made to correct for these slight pitch anomalies. The smallest, and thus, the basic increment of the adjustments made is indicated by the smallest unit of the partial indicator, i.e., the space between the vertical lines (132a) of the partial indicators, or between the base slide position dot (132b) and the nearest vertical line of the partial indicator. The basic increments of the partial indicator that are to the left of the base slide position dot direct a player to shorten the tube of the trombone the number of increments from the base slide position to correct the pitch of a note that is slightly flat when produced at the base position. Increments to the right of the dot direct the player to lengthen the tube to correct a pitch that is slightly sharp when produced at the base slide position.

In the case of the first slide position identifier presented in FIG. 9, which is the "F" note identifier, the partial indicator of the identifier shows an adjustment of two increments to its right, thus indicating the need for lengthening the trombone's tube in order to adjust for a slight sharpening of the note that occurs at the base "F" note slide position.

In the manner described already for clarinet and trumpet, the note letter name for both the slide position number, and for the note sounded for this identifier is represented in its assigned color, thus "flame" for the "F," and "electric" for the "Eb" of the note-sounded note.

Figure 10:
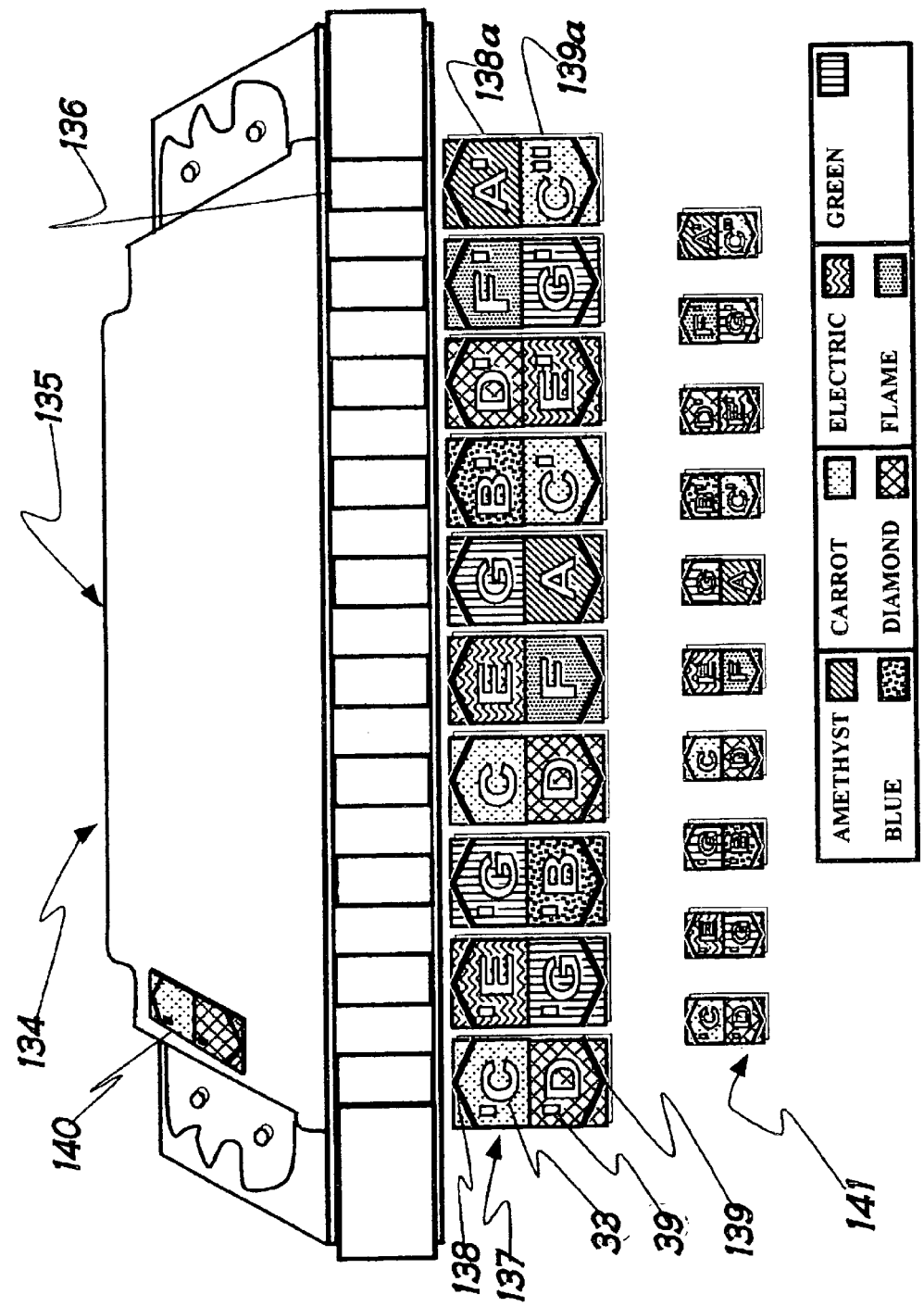
FIG. 10 shows examples of note formation identifiers in the form of exhale/inhale indicators for a basic, key of "C," diatonic, ten-hole harmonica.

FIG. 10 shows an example of the system applied to the harmonica. For the purposes of this description, the harmonica falls into, and is representative of, the category characterized as "unique instruments," others include; accordion, bagpipes, etc. The instruments of this category do not follow a generalized pattern for the method of producing a note, as do the categories of keyboard, strings, woodwinds, and brass. Therefore, though in this description the harmonica represents the category, each instrument of the category would be treated individually when applying the system.

In FIG. 10, note location identifiers of the system applied to the harmonica (134) are shown. The concept for the identifiers that is used for the particular key of "C" ten-hole harmonica of the example, the diatonic type (135) harmonica, could be used with slight variation for most harmonicas. The note location identifiers (137) shown are designed as rectangles which are divided into two sections, one upper (138a), and one lower (139a). The upper section has an exhale symbol (138) which is a stylized pointer indicating that the player should blow to sound the note tone indicated by the note location identifier. The tone is identified on the note location identifier by its note letter name (33), as well as its color and proper pitch marking of the system. The lower section has an inhale symbol (139), indicating that a drawing of air by the player will create the note identified. This lower section note is identified in the same general manner as described for the note of the upper section. These harmonica note location identifiers are attached to the harmonica in correspondence to the ten exhale/inhale holes (136) from which the notes are generated. An example of an affixed identifier (140) is depicted in perspective on the harmonica image of FIG. 10. In addition, a set of note location identifiers (141) for a ten-hole, diatonic harmonica at actual size is shown.

Figure 11:
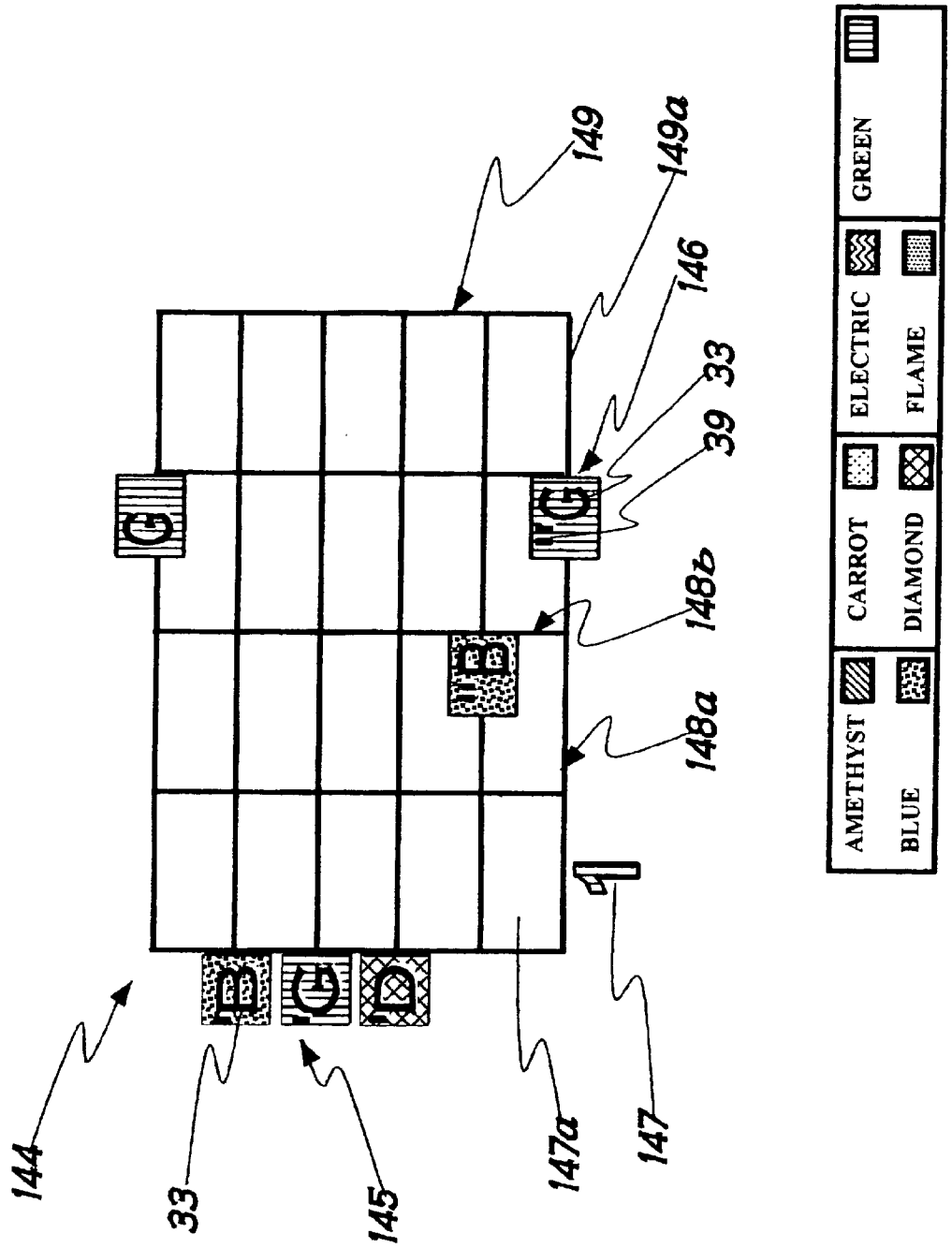
FIG. 11 shows an example of a note location identifier in the form of a chord grid for six-string guitar in the common tuning.
Figure 12:
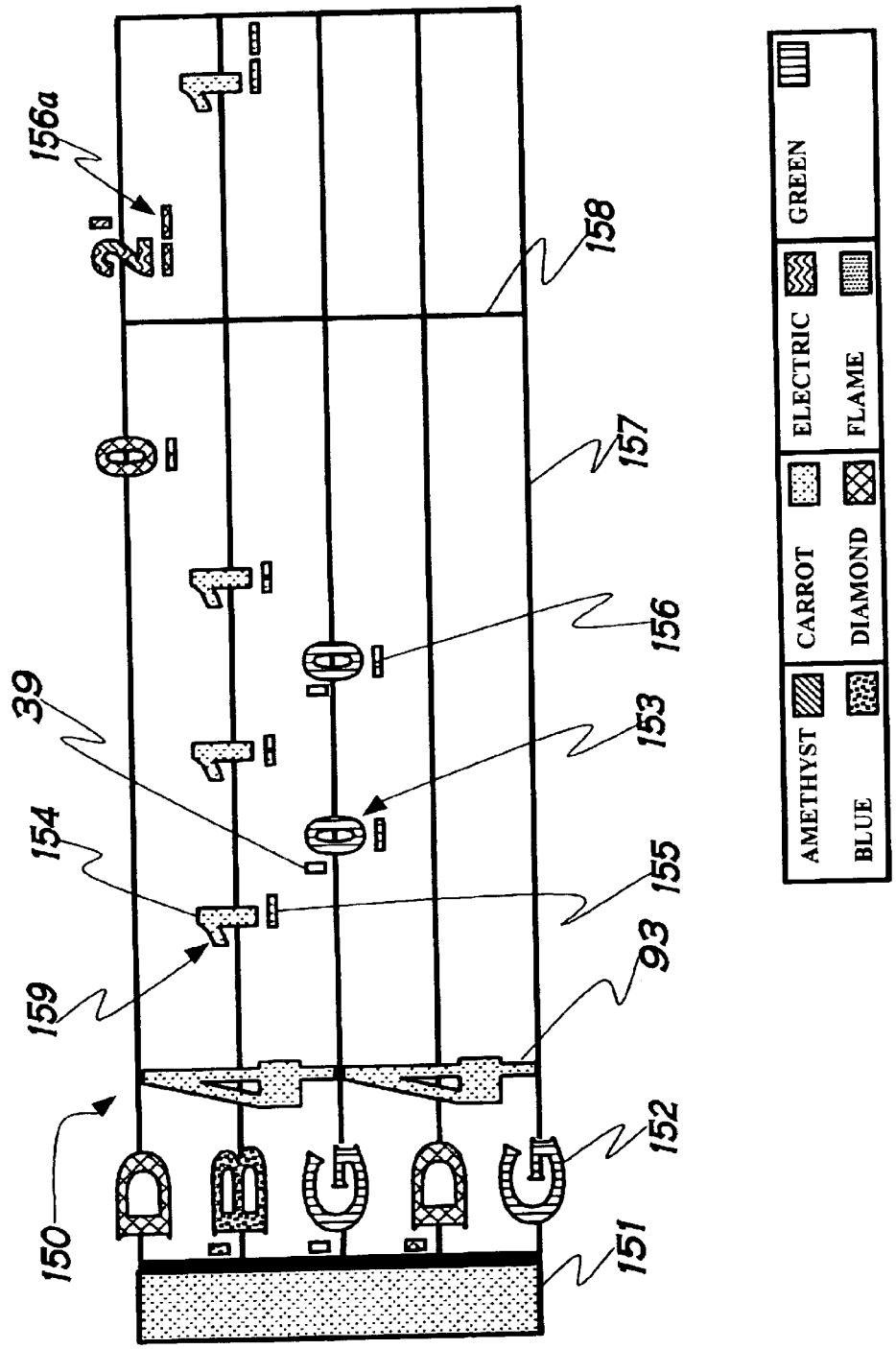
FIG. 12 shows an example of a note location identifier in the form of tablature for five-string banjo.

FIGS. 11 and 12 shown the system applied to two grid-like structures configured to be similar to instrument fingerboards. These two structures are the chord grid, and tablature. They are usually printed directly on musical compositions, either above, or below the staff, or lyrics, or in the place of the staff.

FIG. 11 shows an example of a chord grid, which is a structure that represents musical chords. It is made up of horizontal grid lines that represent the strings of a fingerboard string instrument, and vertical grid lines that represent the frets, or stop locations of such an instrument. As was explained earlier in the descriptions of FIGS. 6 and 7 for string instruments, the fret, and stop locations are places where the finger is pressed to establish a particular length of a string, and thus, the particular note that that string would generate when picked, strummed, bowed, or otherwise activated.

Each chord grid usually depicts a representation of a particular section of an instrument's fingerboard, and on that section representation, the representations of notes that make up a particular chord are depicted. The chord grid usually contains only three or four fret, or stop spaces, thus it is necessary that the location of the first fret, or stop location of the grid be identified so that the chord of the chord grid may be located on a fingerboard. Customarily, a number outside the grid and beneath the first fret, or stop space of the grid identifies the location of that first fret, or stop space, thus enabling identification of the location of the chord on a fingerboard.

In FIG. 11, the exampled chord grid (144), like the paradigm chord grid introduced above, but with the coding system applied, includes; a grid (149), string horizontal grid lines (148a), fret vertical grid lines (148b), a first fret/space identification number (147), and individual note representations. The chord grid depicted represents a "G" chord and as such, the grid lines, and fret number of the chord grid are colored "green," which is the color of the preferred embodiment of the system designated for both the "G" note and "G" chord name. The number of the first fret is "1," which identifies the first fret space (147a) of the chord grid, which is also the first fret of the fingerboard.

The individual note representations of the example chord grid are note location identifiers (146) that have been designed in the same manner as those for the violin and guitar described previously. They are each located in the space adjacent to the fret grid lines. And are represented in the form of rectangles that have been color, and pitch mark coded using the system coding. Thus, for example, the "G" note location identifier on the line of the grid that represents the sixth string (149a), is a "green" rectangle with a "G" note letter (33), and because it is in the second "C" octave group below the "middle C" octave group, it has two pitch marks (39) to the left of its "G" note letter. This design is followed for the other note identifiers of the chord grid. The identifiers for the grid lines representing strings played open (145) are located to the left of the grid and adjacent to the lines that represent those strings.

As stated above, FIG. 12 depicts an example of tablature (150) which is a construction that identifiers notes to be played on an instrument, and which is usually printed as part of a musical composition. It is a hybrid structure that combines elements of a fingerboard with elements of the musical staff. The example depicts tablature for the first two bars of the musical composition, "I've Been Working on the Railroad," to be played on the banjo.

The components of the tablature example presented in the figure, designed with the coding system applied, include: a long narrow rectangle representing a banjo nut (151); horizontal lines that represent the five strings of a banjo (157); note letters identifying the names of the strings (152); a time signature (93); a vertical line representing a staff bar (158); fret number note location identifiers (153) that pinpoint note locations by string and fret location, and time duration marks for both a quarter note (155), and an eighth note (156) duration time.

The banjo nut (151), string (157), and bar (158) representations, as well as the time signature (93) of the FIG. 12 example, are all colored "carrot" to indicate the compositional key of the piece to be played. Each of the note letters which identify the names of the open string notes, (152), is colored its designated note letter color of the system, and each of these note letters is also pitch marked to identify the "C" octave group in which the open string note it names is located. Thus, for example, the fifth string representation is marked with a "green" "G" note letter name, and has no pitch mark since the note represented is in the "middle C" octave group which is represented as "sans pitch mark."

The first numbers (154) shown in the example of FIG. 12 are treated as note location identifiers (153) under the system. They begin with the number "0" which represents a string that is to be played open, or unfretted; and continue with the number "1," which represents the first fret of an instrument; then the number "2" which represents the second fret, and so forth. Each number is colored the color of the note it represents, and is pitch marked to represent the "C" octave group in which the note located. Thus, for example, the first note location identifier of the tablature figure illustration is the "carrot"-colored "1" (159). This means that the note represented is a "C" note that is formed at the first fret of the banjo fingerboard, and since it has no pitch mark; it is located in the "middle C" octave group. To determine the time duration of the note represented, a time duration mark (155) is placed directly below the number of the note location identifier.

Figure 13:
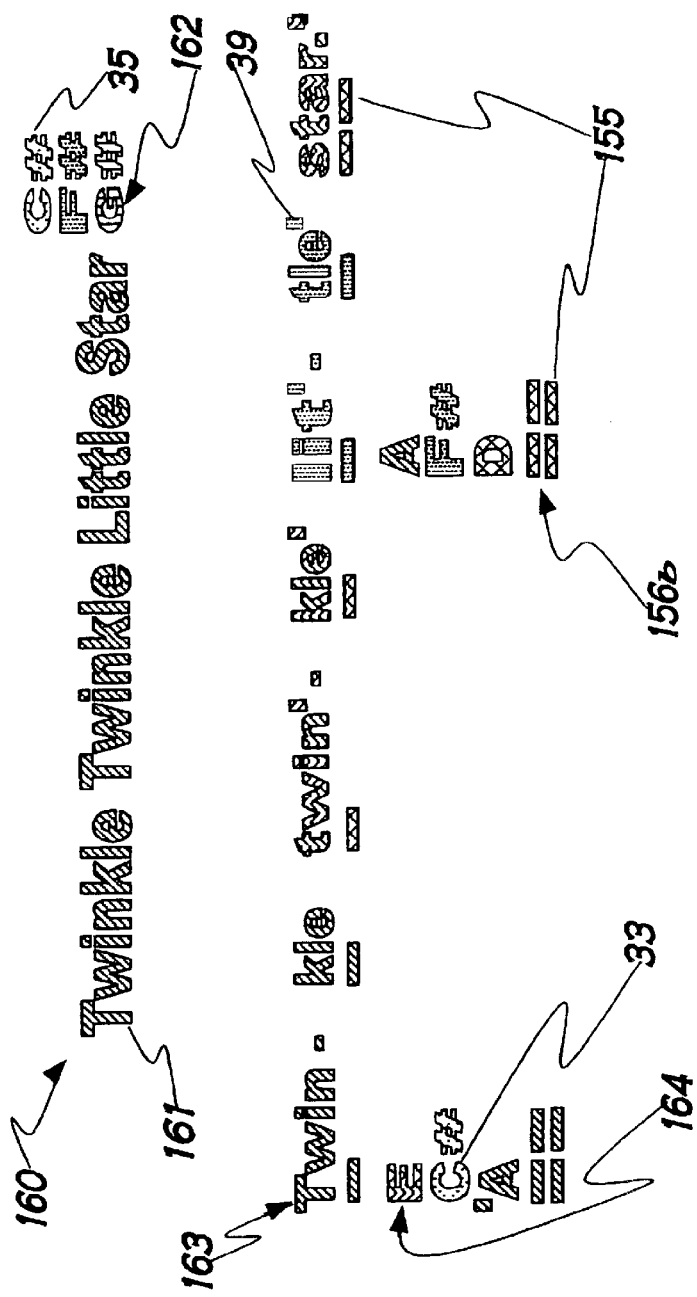
FIG. 13 shows an example of an alternative to the standard musical staff composition structure.
Figure 14:
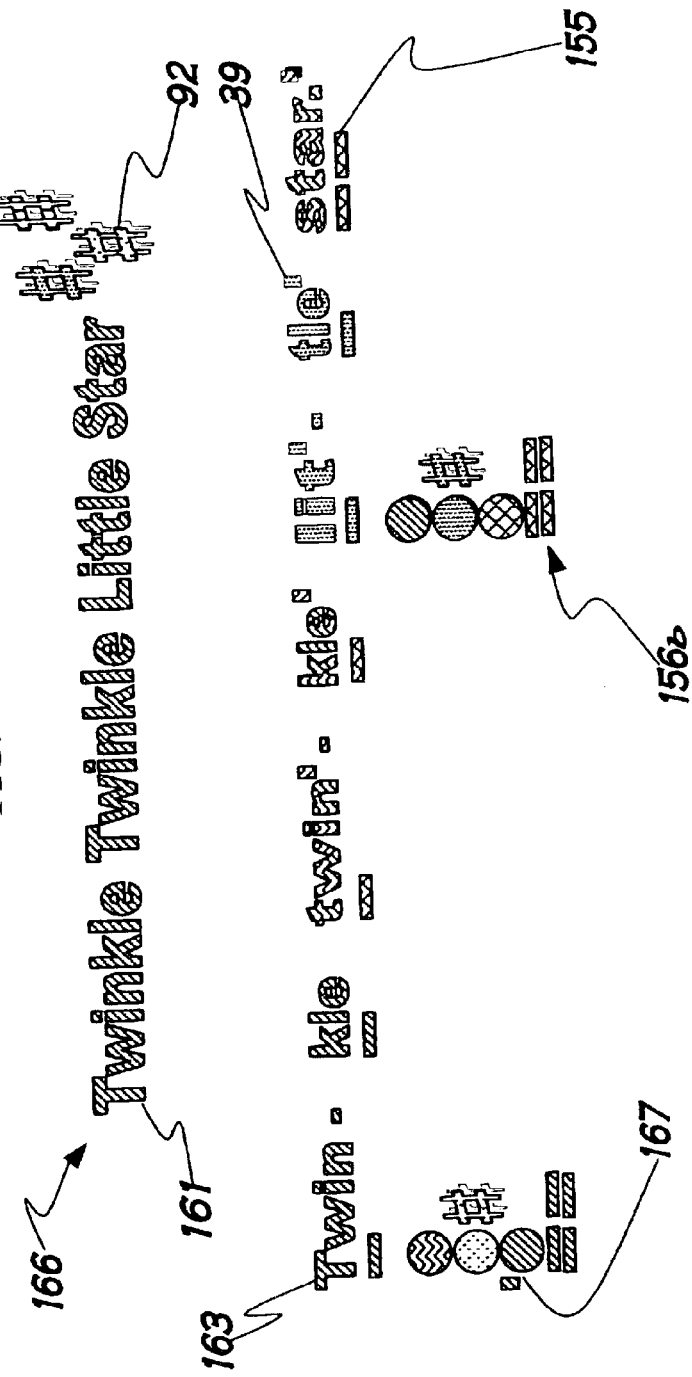
FIG. 14 shows another example of an alternative to the standard staff composition structure.

The alternative form of time duration marks of the system, introduced in FIG. 12 and also shown in FIGS. 13, and 14, are designed such that the basic time duration unit of reference represents a quarter note time duration. That unit is represented as a horizontal rectangle (155). For time durations of longer length, another quarter note duration mark is added for each increase of a quarter note duration time. Thus, for example, as is shown in FIG. 12, two duration marks (156a) represent a half note's time duration. A whole note's time duration is represented by four duration marks, (156b), as is shown in FIGS. 13 and 14. All of these duration marks are solidly colored in the color of the note whose time they are representing. For time durations of less than a quarter note, the quarter note marker is split by vertical lines into even increments with just one increment representing the time duration. That increment is colored the note color while the other increments of the duration mark are left uncolored. Thus, as is shown in FIG. 12, an eighth note duration is represented for the open "G" string of the illustration with one half of the duration mark colored the "green" note color for the "G" note, while the other half remains uncolored, (156). There are two increments since an eighth note is half of a quarter note in duration. This pattern is followed for other smaller time durations.

As stated before in this description, the system can be applied to and expressed not only as an embodiment of standard staff composition structures, but also as an embodiment of a variety of alternative composition structures, such as those shown in FIGS. 13, and 14.

FIG. 13 shows an example of a compositional structure wherein the title (161) of the composition is colored the compositional key color to identify the key of the musical composition, while the key signature is manifested as color-coded note letters, plus color-coded sharp symbols, (162). In this composition embodiment, the actual lyrics (163) are color and pitch mark coded to represent note symbols of a melody. These are in turn combined with color and pitch mark-coded note letter (33) groupings (164) that represent the accompaniment chords. As discussed in the description of FIG. 12, the time duration of notes in this example is represented by the alternative time duration sub-system of the system.

In FIG. 14, an illustration of another alternative composition structure (166) depicts the same title and melody formal as that of FIG. 13, but the key signature (92) in FIG. 14 is expressed as shown before for the standard staff of FIG. 4 and the accompaniment chord note groupings for this structure are expressed as simple color and pitch mark-coded disks (167). Time duration for both this compositional structure and that of FIG. 13 is expressed using a system of dash-like rectangles in the same manner as the time duration rectangles introduced in FIG. 12 for the banjo tablature. The basic unit of this time duration system is the quarter note duration mark (155).

Operation—Preferred Embodiment

To use the preferred embodiment of the system, one first learns the colors of the system and their particular names. These names are then paired each with the musical note of the same letter name.

After one has mastered the basic colors and color naming system, one learns the pitch marking sub-system of the system, which defines the octave group location of each note.

Further, as a part of the preferred embodiment of the invention, one learns the names of images, in the form of fauna, flora, or objects, that are named such that the first letter of each name is also one of the seven musical letter names. These are then each paired with the musical note of the same letter name as the first letter of each image name, as well as with the color name that begins with the same letter as the first letter of each image name.

At this juncture, a musical instrument and a musical composition are provided that have the coloring, pitch marking, and where space allows, the image applied to them to enable the matching of note on instrument to note on musical composition via the coloring, pitch marking, and image, again, where space allows. As described, some instruments, such as string, and keyboard, will have the actual note location marked on the instrument. Other instruments, such as brass and woodwind, will have the diagram of the configuration of the keys and holes to be engaged to produce a note, placed directly on a musical composition, in relation to the note symbol of the composition. At this point, the user may begin to play notes by pairing note symbols on the composition provided to note identifiers of the instrument chosen.

The musical compositions supplied for the system provide other information regarding a piece of music. These include; clef symbols; key, and time signatures; dynamics symbols; note symbol types, and their duration indicators; rest symbols; et cetera, in both conventional and unconventional manifestations. One learns these basic structures to enable the reading and playing of the composition. In addition, one learns that certain elements of the musical composition are colored in the colors of the system to provide even more information so as to facilitate the playing of the composition. Examples of this coding include; the coloring of the staff in order to indicate the key of the piece, the coloring of the sharp and flat symbols of the key signature to enable the recognition and learning of the notes that are sharped or flatted in a particular key signature; and the coloring of a chord grid, or tablature, to identify the chord or notes represented by either of these two identifiers when one is used.

Description—Conclusion, Ramifications and Scope

As is evidenced by the examples discussed above, this system is quite versatile in that it can be applied to a variety of musical composition formats and a variety of instruments. It also has been carefully designed so that it can be used in conjunction with readily available coloring tools, and, because it is a very simple, uncluttered system, other enhancing components can be easily designed and manufactured.

Though it is a simple system, its very specifically designed elements make it unique among other existing color music systems in the facilitation of music understanding. It has been developed to aid the student to more efficiently recognize the connection between the note production mode of an instrument and note symbol on a musical composition. It has also been designed for the player to more efficiently recognize the key of a musical composition, to comprehend and learn key signatures, and more readily comprehend the concepts of pitch, chord, octave, and other musical relationships via the coloring and pitch marking coding. This coloring and pitch marking also enables a quick comprehension of patterns, such as phrasing, in visual musical compositions. And because the sharp and flat note location and formation identifiers of instruments are colored the same as their respective natural note location and formation identifiers, a clearer understanding of that relationship is readily made.

Because of the direct connections made via the specially named coloring and the pitch marking, the system reduces guessing and confusion for the user. This enhances learning and playing speed, while reducing frustration. Because of this, and because the system has been designed to be exciting, especially for younger pupils, the student is more likely to continue the study of music.

Though the chief purpose of the system is to teach the language and symbolism of conventional music, the system can also be used solely as a coded music system to further enable the musician who is not inclined to learn standard musical nomenclature. The musician can comprehend the notes and their location on musical instruments using the coloring and pitch marking of the system, and thus does not need to be known how to read classical music notation.

The present system is highly flexible and can be used in an elementary manner such as for children, as well as in more sophisticated ways, such as for adult instruction. Thus, the more elaborate colored, and pitch marked stylized animal images of the system applied to musical elements would likely be appealing to children, whereas a more streamlined system, involving solely color, and pitch marking, would likely be compatible with an adult's usage.

The system is efficient and easy to master because the user must memorize only the names of the colors, the first letter of each being a musical alphabet note letter, to make a connection to the seven natural note names that are the building blocks of the system. It is important to point out that, though some of the names of the colors, excepting "blue" and "green," of the preferred embodiment of the present invention may appear to be object names, the names are all names of hues of the colors represented. In fact, all but two of the names are in the English Thesaurus as color names. These two the inventor has coined. One is the color "diamond," which is a soft hue of gray, the choice of which is obvious, since diamond is a pure form of carbon. The other is the color "electric," which is a bright hue of yellow. This name has been chosen because of its strong associations with the yellow hues; e.g., the yellow electric light bulb and the yellow electricity symbol.

Certain modifications and improvements will occur to those skilled in the art upon a reading of the foregoing description. All modifications and improvements have been deleted herein for the sake of conciseness and readability but are properly within the scope of the following claims.

I claim:

1. A method of illustrating a set comprising a set of musical notes, said set of musical notes forming an octave group having at least seven musical notes, each musical note having a unique corresponding note letter name, said method comprising:

for each musical note,
associating a unique color with the musical note, the unique color having a color name, the color name alliterating with the corresponding note name; and
presenting the musical note in the associated color such that each musical note in the set has a corresponding color whose name alliterates with the corresponding note letter name.

2. The method of claim 1 further comprising, for each musical note within the set of musical notes, associating an animal with the musical note, the animal having an animal name, the animal name alliterating with the note letter name.

3. The method of claim 2 wherein associating an animal with the musical note comprises associating animal characteristic indicia with the musical note and further comprising, for each note within the set of musical notes, presenting the musical note in conjunction with the animal characteristic indicia.

4. The method of claim 1 further comprising associating at least one of the musical notes with a pitch mark, the pitch mark distinct from said note and positioned on either a left side or a right side of the musical note, the pitch mark identifying an octave group within which the musical note can be found.

5. The method of claim 4 wherein the pitch marks identify octave groups other than an octave group including middle C.

6. The method of claim 4 further comprising presenting the at least one musical note in conjunction with the pitch mark.

7. The method of claim 4 wherein associating the at least one musical note with the pitch mark comprises associating the musical note with a pitch mark composed of one or more vertical dashes.

8. The method of claim 1 further comprising, for at least one of the set of musical notes, associating the musical note with an accidental selected from the group consisting of: indicia for a sharp and indicia for a flat; and presenting the musical note in conjunction with the accidental.

9. The method of claim 1 wherein presenting the musical note comprises presenting the musical note on a musical instrument.

10. The method of claim 1 wherein presenting the musical note comprises presenting the musical note in a musical score as a note symbol.

11. The method of claim 10 further comprising defining a compositional key for a musical composition, the compositional key associated with a second named musical note selected from the group consisting of: A, B, C, D, E, F, G, C#, Db, D#, Eb, F#, Gb, G#, Ab, A#, and Bb.

12. The method of claim 11 further comprising associating structural elements of the musical score with a compositional color, the compositional color alliterating with the second named musical note, said structural elements selected from the group consisting of: braces, staves, lines, clef symbols, time signatures, bars, rests, lyrics, titles, and dynamics.

13. The method of claim 8 wherein the accidental is colored the same color as the corresponding musical note letter name.

14. The method of claim 1 wherein presenting the musical note in the associated color comprises presenting the musical note on a sticker adapted to be applied to a musical instrument.

15. The method of claim 1 wherein presenting the musical note in the associated color comprises presenting the musical note by coloring portions of a musical instrument.

16. The method of claim 15 wherein presenting the musical note by coloring portions of the musical instrument comprises coloring a portion of the musical instrument selected from the group consisting of: a keyboard instrument, a string instrument, a percussion instrument, and a harmonica.

17. The method of claim 1 further comprising, in association with a musical instrument, wherein said musical instrument requires use of a plurality of actuators to form a single note, for each musical note within the set of musical notes, presenting a note formation technique for forming the musical note on the musical instrument.

18. The method of claim 17 wherein presenting a note formation technique for forming the musical note on a musical instrument comprises presenting a note formation technique for a musical instrument selected from the group consisting of: woodwind and brass.

19. The method of claim 1 further comprising presenting a chord grid with notes thereon.

20. The method of claim 19 wherein presenting the chord grid comprises presenting the chord grid in a chord color, said chord color corresponding to one of said color names such that said chord color effectively identifies a chord.

21. A system of illustrating a set of musical notes collectively forming an octave group having at least seven notes, each musical note having a unique corresponding note letter name, said system comprising:

for each musical note:
means for presenting the musical note with an associated unique color, the associated color having a color name, the color name alliterating with the note letter name such that each musical note in the set has a corresponding color whose name alliterates with the corresponding note letter name.

22. The system of claim 21 wherein the presenting means comprises a sticker.

23. The system of claim 21 wherein the presenting means comprises a musical instrument with the musical note printed thereon.

24. The system of claim 21 wherein the presenting means comprises a musical score with the musical note printed therein as a note symbol.

25. The system of claim 21 wherein for at least one musical note within the set of musical notes, the at least one musical note has an accidental associated therewith, the accidental colored identically to the associated color and the accidental selected from the group consisting of: indicia for a sharp and indicia for a flat.

26. The system of claim 21 wherein for at least one note within the set of musical notes, the musical note has a pitch mark associated therewith, wherein the pitch mark is distinct from the musical note.

27. The system of claim 26 wherein the pitch mark comprises one or more vertical dashes.

28. The system of claim 26 wherein the pitch mark is positioned proximate to a side of the musical note.

29. The system of claim 21 wherein the musical note is further associated with an animal whose name alliterates with the note letter name.

30. The system of claim 29 wherein the musical note is presented with animal characteristic indicia.

31. The system of claim 26 wherein the pitch marks denote octave groups other than an octave group including middle C.

32. The system of claim 24 wherein the musical score further comprises structural elements and said structural elements are colored according to a compositional key color and having a compositional key color name, said compositional key color name alliterating with a compositional key in which a musical composition presented in the musical score is composed.

33. The system of claim 32 wherein the structural elements are selected from the group consisting of: braces, staves, lines, clef symbols, time signatures, bars, rests, lyrics, titles, and dynamics.

34. The system of claim 21 further comprising means for presenting note formation on a musical instrument.

35. The system of claim 34 wherein said means for presenting note formation on an instrument comprises colored indicia, said colored indicia having a colored indicia name and said colored indicia name alliterates with a corresponding note letter name.

36. The system of claim 35 wherein said means for presenting note formation comprises a plurality of note formation identifiers, one note formation identifier corresponding to each note within the set of musical notes.

37. A method for illustrating a musical note, said note having a note name selected from the group consisting of: A, B, C, D, E, F, G, said method comprising:
    associating a color with the musical note, said color having a name, said name alliterating with the note name;
    associating an animal with the musical note, said animal having an animal name, said animal name alliterating with the note name, said animal having animal characteristic indicia;
    associating the musical note with an octave group;
    associating the musical note with a pitch mark based on the octave group in which the musical note lies, said pitch mark selected from the group consisting of: zero, one, two, three, and four vertical dashes; and
    presenting the musical note in the associated color with the animal characteristic indicia and the pitch mark.

38. The method of claim 37 wherein associating a color with the musical note comprises associating a color selected from the group consisting of: amethyst, blue, carrot, diamond, electric, flame, and green.

39. The method of claim 37 further comprising associating an accidental with the musical note, said accidental selected from the group consisting of: sharp and flat, and further comprising presenting the musical note with said accidental colored identically to said note.

40. The method of claim 37 wherein presenting the musical note comprises presenting the musical note on a sticker.

41. The method of claim 37 wherein presenting the musical note comprises presenting the musical note on a musical instrument.

42. The method of claim 37 wherein presenting the musical note comprises presenting the musical note on a printed musical score.

43. A method of presenting a musical composition, comprising:
    creating a set of structural components for a musical score, said musical score being a printed embodiment of the musical composition and said set of structural components selected from the group consisting of: braces, staves, lines, clef symbols, time signatures, bars, rests, lyrics, titles, and dynamics;
    selecting a compositional key for the musical composition, wherein said compositional key represents a musical key in which the musical composition is to be played; and
    coloring the structural components with a color.

44. The method of claim 43 wherein the color has a name whose name alliterates with a name associated with the compositional key.

45. The method of claim 43 further comprising placing colored notes on the structural components, said notes being colored such that the names of the colors of the notes alliterate with names of the notes.

46. A method of presenting a musical composition, comprising:
    creating a set of structural components for a musical score, wherein the set of structural components selected from the group consisting of: braces, staves, lines, clef symbols, time signatures, bars rests, lyrics, titles, and dynamics, said musical score being presented in a key;
    selecting a key signature for the musical score, wherein the key signature lists accidentals for the key in which the musical score is presented;
    associating a color with a musical note; and
    presenting an accidental in the key signature on the structural components, wherein the accidental corresponds to the musical note and the accidental signal is presented in the color associated with the musical note.

47. The method of claim 46 wherein the accidental signal is selected from the group consisting of: sharps and flats.

48. The method of claim 46 further comprising presenting a plurality of accidental signals, each in a color whose name alliterates with a musical note to which the accidental signal corresponds.

49. The method of claim 46 wherein the color is selected from the group consisting of: amethyst, blue, carrot, diamond, electric, flame, and green.

50. A method of illustrating a plurality of musical notes, comprising:
    dividing said plurality of notes into a plurality of sequential octave groups;
    designating one of said plurality of octave groups as a default octave group;
    for musical notes outside of said default octave group, associating one or more pitch marks with each of said musical notes, wherein the number of pitch marks indicates an octave group position within the plurality of sequential octave groups, said octave group position relative to said default octave group; and
    presenting said musical notes outside of said default octave group with said one or more pitch marks, wherein said presenting is accomplished by positioning said one or more pitch marks on a left side of the musical note if the musical note belongs to an octave group that is lower in pitch than the default octave group within the plurality of sequential octave groups, and positioned to the right side of the musical note if the musical note belongs to an octave group that is higher in pitch than the default octave group within the plurality of sequential octave groups.

51. The method of claim 50 wherein said one or more pitch marks comprise one or more vertical dashes.

52. The method of claim 50 wherein each of said plurality of notes is colored.

53. The method of claim 52 wherein each of said plurality of notes has a note letter name and wherein colors used to color each of said plurality of notes each have a color name and wherein corresponding color names and note letter names alliterate.

54. The method of claim 53 wherein the default octave group contains middle C, and other ones of said plurality of sequential octave groups lie on either side of said default octave group on a musical scale.

55. The method of claim 46 wherein the color associated with the musical note has a color name, said color name alliterating with a name of the musical note.

56. The method of claim 50 further comprising, for each of said plurality of notes, associating an animal with the musical note, said animal having an animal name.

57. The method of claim 56 wherein said animal name alliterates with the note to which the animal corresponds.

58. The method of claim 56 wherein each of said plurality of notes has a note name and wherein colors used to color each of said plurality of notes each have a color name and wherein corresponding color names and note names alliterate.

* * * * *